US006707516B1

(12) United States Patent
Johnson et al.

(10) Patent No.: US 6,707,516 B1
(45) Date of Patent: Mar. 16, 2004

(54) SINGLE-PANEL FIELD-SEQUENTIAL COLOR DISPLAY SYSTEMS

(75) Inventors: Kristina M. Johnson, Longmont, CO (US); Gary D. Sharp, Boulder, CO (US)

(73) Assignee: Colorlink, Inc., Boulder, CO (US)

( * ) Notice: Subject to any disclaimer, the term of this patent is extended or adjusted under 35 U.S.C. 154(b) by 0 days.

(21) Appl. No.: 09/165,127

(22) Filed: Oct. 2, 1998

Related U.S. Application Data

(63) Continuation-in-part of application No. 09/126,330, filed on Jul. 31, 1998, which is a continuation-in-part of application No. 08/853,468, filed on May 9, 1997, now Pat. No. 5,990,996, and a continuation-in-part of application No. 08/645,580, filed on May 14, 1996, now Pat. No. 5,822,021, and a continuation-in-part of application No. 08/855,716, filed on May 8, 1997, now Pat. No. 5,953,083, which is a continuation-in-part of application No. 08/447,522, filed on May 23, 1995, now Pat. No. 5,751,384, and a continuation-in-part of application No. 09/164,774, filed on Oct. 1, 1998, now abandoned, which is a continuation-in-part of application No. 09/085,971, filed on Jun. 12, 1998, now abandoned.

(51) Int. Cl.[7] .............................................. G02F 1/1335
(52) U.S. Cl. .............................................. 349/78; 349/5
(58) Field of Search ................. 348/742, 743, 348/758; 349/78, 79, 5, 119; H04N 9/12, 5/74

(56) References Cited

U.S. PATENT DOCUMENTS

| 2,493,200 | A |   | 1/1950  | Land            |         |
|-----------|---|---|---------|-----------------|---------|
| 2,638,816 | A |   | 5/1953  | Stolzer         |         |
| 2,715,153 | A | * | 8/1955  | Sziklai         | 348/817 |
| 3,781,465 | A | * | 12/1973 | Ernstoff et al. | 348/742 |
| 4,003,081 | A |   | 1/1977  | Hilsum et al.   |         |

(List continued on next page.)

FOREIGN PATENT DOCUMENTS

| JP | 56137307 A  | 10/1981 |
| JP | 63182987 A  | 7/1988  |
| JP | 03028823 A  | 2/1991  |
| JP | 04207774 A  | 7/1992  |
| JP | Hei 7-84218 | 3/1995  |
| WO | WO 90/09614 | 8/1990  |

OTHER PUBLICATIONS

US 4,917,464, 4/1990, Conner (withdrawn)
Wang, Y., "Surface Plasmon Tunable Color Filter and Display Device," Novel Display Devices; 7.1, pp. 63–66, SID Digest (1997).
"Achromatic phase–shifters: 2. A quantized ferroelectric liquid–crystal system", P. Hariharan et al., 2319 Optics Communications 117 (1995) May 15, Nos. 1/2, Amsterdam, NL, pp. 13–15.
"Achromatic retardation plates", Alan M. Title et al., SIPE vol. 307 Polarizers and Applications (1981), pp. 120–125.
"Improvement of Birefringent Filters. 2:Achromatic Waveplates", Alan M. Title, January 1975/ vol. 14, No. 1/ Applied Optics, pp. 229–237.
Sharp, Gary Dean, "Chiral smetic liquid crystal tunable optical filters and modulators", 1992.

*Primary Examiner*—Kenneth Parker
(74) *Attorney, Agent, or Firm*—Fleshner & Kim LLP

(57) ABSTRACT

The present invention provides a single-panel field-sequential full color display systems that are less complex, smaller in size and less costly than prior additive split-path color systems, while exhibiting higher light output, greater flexibility and greater reliability than prior single-panel field-sequential systems. In the first preferred embodiment, the display system includes a "frame buffer" style spatial light modulator, in which a frame buffer pixel circuit is integrated into the spatial light modulator. The display system of the present invention also preferably includes on opto-electronic color sequencer which allows for the electronic control of the transmission of additive primary colors.

68 Claims, 20 Drawing Sheets

U.S. PATENT DOCUMENTS

| | | | |
|---|---|---|---|
| 4,019,808 A | 4/1977 | Scheffer | |
| 4,025,164 A | 5/1977 | Doriguzzi et al. | |
| 4,232,948 A | 11/1980 | Shanks | |
| 4,367,924 A | 1/1983 | Clark et al. | |
| 4,416,514 A | 11/1983 | Plummer | |
| 4,448,823 A | 5/1984 | Clifford | |
| 4,497,543 A | 2/1985 | Aoki et al. | |
| 4,566,761 A | 1/1986 | Carlsen et al. | |
| 4,575,193 A | 3/1986 | Greivenkamp, Jr. | |
| 4,582,396 A | 4/1986 | Bos et al. | |
| 4,635,051 A | 1/1987 | Bos et al. | |
| 4,652,087 A | 3/1987 | Bos et al. | |
| 4,668,086 A | 5/1987 | Redner | |
| 4,685,773 A | 8/1987 | Carlsen et al. | |
| 4,758,818 A | 7/1988 | Vatne | |
| 4,759,612 A | 7/1988 | Nakatsuka et al. | |
| 4,770,500 A | 9/1988 | Kalmanash et al. | |
| 4,770,525 A | 9/1988 | Umeda et al. | |
| 4,786,146 A * | 11/1988 | Ledebuhr | 349/9 |
| 4,786,964 A | 11/1988 | Plummer | |
| 4,796,978 A | 1/1989 | Tanaka et al. | |
| 4,808,501 A | 2/1989 | Chiulli | |
| 4,834,508 A | 5/1989 | Fergason | |
| 4,867,536 A | 9/1989 | Pidsosny et al. | |
| 4,917,465 A | 4/1990 | Conner et al. | |
| 4,966,441 A | 10/1990 | Conner | |
| 4,995,702 A | 2/1991 | Aruga | |
| 5,032,007 A | 7/1991 | Silverstein et al. | |
| 5,033,825 A | 7/1991 | Ishikawa et al. | |
| 5,050,965 A | 9/1991 | Conner et al. | |
| 5,111,315 A * | 5/1992 | Ledebuhr | 349/5 |
| 5,122,887 A | 6/1992 | Mathewson | |
| 5,124,818 A | 6/1992 | Conner | |
| 5,126,864 A | 6/1992 | Akiyama et al. | |
| 5,132,826 A | 7/1992 | Johnson et al. | |
| 5,172,221 A * | 12/1992 | Ko | 348/761 |
| 5,179,459 A | 1/1993 | Plesinger | |
| 5,220,447 A | 6/1993 | Yokokura et al. | |
| 5,231,432 A | 7/1993 | Glenn | |
| 5,233,385 A * | 8/1993 | Sampsell | 355/35 |
| 5,237,435 A | 8/1993 | Kurematsu et al. | |
| 5,243,455 A | 9/1993 | Johnson et al. | |
| 5,249,071 A | 9/1993 | Yoshimizu et al. | |
| 5,268,782 A | 12/1993 | Wenz et al. | |
| 5,276,436 A | 1/1994 | Shaw et al. | |
| 5,299,039 A | 3/1994 | Bohannon | |
| 5,321,450 A | 6/1994 | Shapiro et al. | |
| 5,337,103 A | 8/1994 | Gulick | |
| 5,337,174 A | 8/1994 | Wada et al. | |
| 5,347,378 A | 9/1994 | Handschy et al. | |
| 5,353,075 A | 10/1994 | Conner et al. | |
| 5,355,188 A | 10/1994 | Biles et al. | |
| 5,369,513 A | 11/1994 | Akatsuka et al. | |
| 5,381,253 A | 1/1995 | Sharp et al. | |
| 5,400,095 A | 3/1995 | Minich et al. | |
| 5,422,756 A | 6/1995 | Weber | |
| 5,469,279 A | 11/1995 | Sharp et al. | |
| 5,500,523 A | 3/1996 | Hamanaka | |
| 5,510,861 A | 4/1996 | Minich | |
| 5,528,393 A | 6/1996 | Sharp et al. | |
| 5,534,949 A | 7/1996 | Baron | |
| 5,559,634 A | 9/1996 | Weber | |
| 5,565,933 A * | 10/1996 | Reinsch | 348/742 |
| 5,566,010 A * | 10/1996 | Ishii et al. | 349/42 |
| 5,574,580 A | 11/1996 | Ansley | |
| 5,585,950 A | 12/1996 | Nishino et al. | |
| 5,608,551 A | 3/1997 | Biles et al. | |
| 5,654,775 A * | 8/1997 | Brennesholtz | 348/742 |
| 5,658,490 A | 8/1997 | Sharp et al. | |
| 5,686,931 A | 11/1997 | Fünfschilling et al. | |
| 5,689,317 A | 11/1997 | Miller | |
| 5,739,881 A | 4/1998 | Xu et al. | |
| 5,774,264 A | 6/1998 | Konno et al. | |
| 5,777,709 A | 7/1998 | Xu et al. | |
| 6,097,352 A * | 8/2000 | Zavracky et al. | 345/7 |
| 6,359,662 B1 * | 3/2002 | Walker | 348/743 |
| 6,392,717 B1 * | 5/2002 | Kunzman | 348/744 |

* cited by examiner

SINGLE-PANEL FIELD-SEQUENTIAL COLOR DISPLAY SYSTEMS

This application is a continuation-in-part application of Ser. No. 09/126,330, filed Jul. 31, 1998, which is a continuation-in-part application of Ser. No. 08/853,468, filed May 9, 1997 now U.S. Pat. No. 5,990,996, and a continuation-in-part application of Ser. No. 08/645,580, filed May 14, 1996 now U.S. Pat. No. 5,822,021. This application is also a continuation-in-part of application Ser. No. 08/855,716, filed May 8, 1997 now U.S. Pat. No. 5,953,083, which is a continuation of application Ser. No. 08/447,522, filed May 23, 1995, now U.S. Pat. No. 5,751,384. This application is also a continuation-in-part of U.S. application Ser. No. 09/164,774 now abandoned, filed Oct. 1, 1998, entitled "Display Architectures Using Electronically Controlled Color Filters" (CLNK-11), which in turn is a continuation of application Ser. No. 09/085,971, filed Jun. 12, 1998 now abandoned.

BACKGROUND OF THE INVENTION

1. Field of the Invention

The present invention relates to color display systems. More specifically, the present invention relates to a single-panel field-sequential color display system for generating high resolution, full color images.

2. Background of the Related Art

There is a need for low cost, high resolution color display systems for use in large screen, high-definition television sets, computer monitors, data projectors and other commercial, industrial, training and entertainment display products.

Full color display is generally implemented using one of five techniques: (1) spatially using color filter arrays; (2) temporarily using sequential color techniques; (3) additively using multiple optical paths; (4) subtractively using stacked display panels; or (5) additively using stacked display panels.

In spatial color systems, each full-color pixel in a full-color display is subdivided into at least three pixels, with one pixel dedicated to each additive primary color. In a cathode ray tube display system, the sub-pixels are implemented with phosphors that are excited by an electron gun, causing them to become luminous. A color filter array consisting of red, green and blue spectral filters is registered to the phosphor pixel array. Similarly, in spatial color display systems that utilize a spatial light modulator, a color filter array is registered to the active pixel elements of the spatial light modulator, such that the transmission or reflection level of each primary color can be locally controlled.

One problem with spatial color systems is that the sub-pixels must be sufficiently small so that they are not individually resolvable by the viewer. The resulting spatial integration of the sub-pixels by the eye yields a perceived full-color image. In addition, because each full-color pixel must be subdivided into three sub-pixels, the spatial light modulators used in spatial color systems require three times the number of pixels than those used in monochrome displays.

In additive split-path color display systems, the three additive primary colors (red, green and blue) are displayed using three separate panels (channels) e.g., three spatial light modulators. The three panels project three different color representations of the same image simultaneously such that the three separate images overlap at an image plane. The three color images "add" up to give an accurate full color representation of the image. The main problem with this approach is cost, size and weight. Three separate image sources are required, each with its own set of associated optics. The higher the number of panels, the larger the system. In addition, a complicated combination optics is usually required with this approach.

In a stacked display system, three optical paths are effectively created without wavefront shearing. There are two types of stacked display systems: (1) additive, where each display panel contributes red, green and blue light; and (2) subtractive, where pixels in each display panel subtract red, green or blue light. The term subtractive is appropriate because such systems are analogous to color film. Although all of the light travels along the same physical path, only specific layers of the structure manipulate light in each wavelength band. In practice, a full-color display consists of a stack of three co-registered transmissive display panels, e.g., spatial light modulators, each responsible for independently determining the local transmission of one additive primary color.

Because there is only one physical path, each stage must be made independent of the other using wavelength selective effects. Luminance modulation with a liquid crystal display requires both a polarized input and an effective voltage-controlled analyzing polarizer. Thus, color independent luminance modulation is typically achieved by wavelength selectively controlling the degree of input polarization, and/or the wavelength selectivity of the analyzer.

Compared to split-path display systems, stacked display systems have unique design challenges. In order to obtain high optical throughput, the optical transmission losses of the display panels must be low, the transmission losses of any passive color control elements must be low, and images must be efficiently relayed between display panels. In stacked direct view display systems, there are additional complications associated with color quality and parallax when the display is viewed off-normal.

In field-sequential color display systems, sub-frames are displayed, with each sub-frame comprising the distribution of an additive primary color in a full-color image. In single-panel field-sequential color display systems, a single image source or panel is used. The three additive primary color images are displayed in three separate sub-frames sequentially during one display frame. Display frame rates are typically 60 Hz (1/60 of a second per frame). The three additive primary color images are displayed in sequence at a rate that is three times the frame rate (typically $\geq 180$ Hz) or higher so that all three additive primary color images are displayed over the course of one display frame. The eye integrates the sub-frames temporally, yielding a perceived full-color image. This technique is preferable over additive or subtractive three-panel systems in terms of cost and complexity because only one display panel is used.

The main disadvantage of field-sequential color display systems is reduced light output (luminance). This is due to the fact that each separate color image is displayed for only one-third of a frame as compared to a full frame in an additive or subtractive three-panel system. In addition, since the intensity distribution of the image will change according to which color is being displayed, the image source, e.g., spatial light modulator, must be able to respond or switch in 1/180 of a second or less as opposed to 1/60 of a second in an additive system (all three color image sources remain static for one full frame in a additive split-path system).

In a single-panel field-sequential color display system, the spatial light modulator must be sequentially illuminated with red, green and blue light in synchronism with the driving of the spatial light modulator with red, green and blue image information. This is typically accomplished by sequentially filtering a broad band (white) light source with a color filter, for high brightness applications, or a set of three lasers or three LEDs that can be individually modulated at ≧180 Hz.

A color wheel is commonly used as the color filter in single-panel field-sequential color display systems employing a lamp. The color wheel may be divided into thirds, with one-third passing red light, one-third passing green light, and one-third passing blue light. The color wheel is positioned between the light source and the spatially light modulator, and is rotated so that each primary color illuminates the spatial light modulator while the spatial light modulator is driven with the image data for that color.

One disadvantage of using a color wheel is that the color display sequence is fixed and cannot be changed without changing the color wheel. In addition, as the color wheel rotates from one color filter to the next, the spatial light modulator must be blanked for an amount of time that depends on the size of the illumination spot on the color wheel and its rotation rate to avoid color mixing. This blanking time can be longer than the amount of time it takes to load image data into the spatial light modulator, which reduces the display system brightness and hence the optical efficiency. In addition, color wheels require motors, controllers and fans to operate, and contribute to the size, weight, cost, and power consumption of the display system.

Spatial light modulators (SLMs) that can be used with the above-described display systems include transmissive and reflective liquid crystal devices (LCDs) using amorphous silicon thin film transistors and single crystalline silicon systems, digital micro-mirror devices PMDs), optically-addressed SLMs, such as the optically addressable SLMs disclosed in U.S. Pat. No. 4,941,735 to Moddel et al. and in U.S. Pat. No. 5,073,010 to Johnson et al., grating light valves, and others. These systems typically project an image from an array of individual elements, each corresponding to a picture element (pixel) on the displayed image.

One difference between SLMs that use liquid crystals and DMD SLMs is that, in general, liquid crystals must be switched with zero net DC electric field. This is because liquid crystals have ionic impurities that migrate under the influence of an applied electric field. Positive charges migrate to the negative terminal or negative charges are attracted to the positive terminal. This sets up a back electromotive force that causes image "sticking", i.e., the liquid crystal cell stops switching. Because of the purity of active-matrix-compatible nematic liquid crystals, it may be possible to assume that, over time, the statistical variation in pixel voltages will average out to zero net DC. However, this may result in reducing the lifetime and reliability of the spatial light modulator. The safest approach is to DC balance the spatial light modulator.

One method for DC balancing involves applying voltages of equal amplitude and duration, but opposite polarity to the pixels. However, additional time is required to load the opposite voltages (inverse data). For a nematic liquid crystal, the image frame and inverse frame are both viewable as valid image data because the torque on the molecules is a second-order function of the applied electric field. This results in the same optical grey-scale value for both electrical polarities. Ferroelectric and other chiral smectics have a torque that is a first-order function of the applied electric field. Hence, the frame and the inverse (or DC balance) frame are not generally valid frames for viewing.

Spatial light modulators can be classified as analog or binary in nature. DMDs and ferroelectric LCDs are generally binary devices with symmetric response times. Nematic LCDs are generally analog devices. It is possible to display grey-scale or color images with binary spatial light modulators. It is known that when a person views a rapidly cycled sequence of binary images, the person may, if the rate and duration of the images is adjusted accordingly, temporally integrate the sequency of binary images so that they appear to be grey-scale or color images.

A problem with generating grey-scale or color images with binary spatial light modulators is that the binary spatial light modulator must be fast enough to display many binary subframe images on the display such that these subframes are temporally integrated to create grey-scale data. At a display subframe rate of 1/t, the binary spatial light modualtor must be capable of responding in time t. This places a limitation on which binary spatial light modulators can be used. Namely, spatial light modulators generally require response rates at least as great as 1/t Hz (frames per second), to be used for optimizing grey-scale depth in color and display brightness. The temporal integration process requires that t is small, otherwise the display will appear to flicker and will not appear to provide a grey-scale or color image.

Currently, there are a variety of display devices that may be used to output the binary sub-frames. Liquid crystal on silicon (LCOS) devices that have been designed as spatial light modulators have used pixel designs which can be catagorized as being either "dynamic" or "static." A static pixel design has a memory element at each pixel, which can store the pixel data indefinitely without the need for periodic refresh cycles. This is analogous to SRAM (static random access memory) in computer memory. A dynamic pixel stores data capacitively and requires a periodic refresh to compensate for leakage of the stored charge, analogous to DRAM (dynamic random access memory).

Dynamic pixel and static pixel spatial light modulators share the property that as the array of pixels is addressed in sequence, row-at-a-time, the liquid crystal spatial light modulator begins to update the new image data immediately after the row addresssed. In reasonably high resolution spatial light modulators, such as SXGA display having 1280×1024 pixels, the electronic refresh time is longer than the liquid crystal switching time. For example, if binary data is supplied to the display through thirty-two data wires running at fifty megabits/second, such an array of pixels takes approximately 800 microseconds to update. The liquid crystal can respond to an applied voltage in approximately several hundred microseconds, depending on the liquid crystal cell gap and the liquid crystal fluid properties (e.g., viscosity, $K_{xx}$ constants). It is valid, therefore, to view the spatial light modulator as being updated in a sweeping motion across this area. True analog displays may use fewer parallel input lines, increasing the time it takes to refresh or write data to the display.

As discussed above, in single-panel field-sequential display systems, precise synchronization between the illuminating color source and the color image data on the spatial light modulator is required. Therefore, the color image data on the spatial light modulator must be simultaneously valid before it can be usefully viewed.

The above references are incorporated by reference herein where appropriate for appropriate teachings of additional or alternative details, features and/or technical background.

SUMMARY OF THE INVENTION

The present invention provides single-panel field-sequential full color display systems that are less complex, smaller in size and less costly than prior art additive split-path color systems, while exhibiting higher light output, greater flexibility and greater reliability than prior single-panel field-sequential color display systems.

The display system of the present invention comprises a light source, illumination optics, a color sequencer, a single spatial light modulator and display optics. In a first embodiment, the spatial light modulator comprises a "frame buffer" style spatial light modulator, in which a frame buffer pixel circuit is integrated into the spatial light modulator. The frame buffer pixel circuit is used to load an entire frame of data onto the spatial light modulator before displaying that image frame. While image data for a new image frame is being buffered or stored on the pixels, the image data for the previous image frame is displayed. The frame buffer circuit comprises an array of pixel buffers that are coupled to integrated electronics and to the driving electrodes of the spatial light modulator, and is adapted to approximately simultaneously transfer image data from the pixel buffers to the driving electrodes.

In a second embodiment, the color sequencer comprises an opto-electronic color sequencer which allows for the electronic control of the transmission of additive primary colors.

The single-panel field-sequential color display systems of the present invention can be implemented in reflective or transmissive modes, and can be adapted for front projection or rear projection display systems.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 9 shows a preferred spatial light modulator used in the display systems of. FIGS. 1–4, 7 and 8;

DETAILED DESCRIPTION OF PREFERRED EMBODIMENTS

Some definitions that are used to characterize the structures in the present invention and their behavior will now be provided.

An additive primary color is one that is identifiable as a substantially saturated red (R), green (G) or blue (B) by a viewer with normal color vision. Conversely, colors that are desaturated RGB hues are termed pastels. Colors that are saturated but have other hues can be produced as admixtures of the additive primary colors, i.e., yellow or orange.

The term "substractive primary color" refers to the absence of one additive primary color. These are known as cyan (C), magenta (M) and yellow (Y), and are the colors used in substractive systems, i.e., printing systems. Unless otherwise stated cyan is considered to be blue+green, magenta is considered to be blue+red, and yellow is considered to be green+red. Monochromatic yellow is referred to as true-yellow.

Colors are complementary when the sum of their power spectra gives a true white spectrum, i.e., cyan+red, magenta+green, or yellow+blue. By conversion of power, complementary colors can be generated, for instance, by rotating a neutral analyzing polarizer, following an arbitrary polarizer/retarder stack, through $\pi/2$.

The human eye has a wavelength-dependent sensitivity, being most sensitive to green light during normal daylight illumination conditions. Conversely, the eye is nearly insensitive to short wavelength blue light, i.e., less than 400 nm, and long wavelength red light, i.e., greater than 700 nm.

The eye has three discrete photoreceptors that correspond to the three additive primaries. As such, the eye can be "tricked" into observing arbitrary colors using appropriate mixtures of the three additive primaries. This allows for the generation of full color imagery using only three-color information. The additive primaries are separated by transition bands that are, in principle, not necessary for full color imagery. These transision bands are true cyan, at a wavelength of approximately 500 nm, and true yellow, at a wavelength of approximately 585 nm. In many instances, the transition bands are rejected in order to display saturated colors without overlap.

Figure 1A:
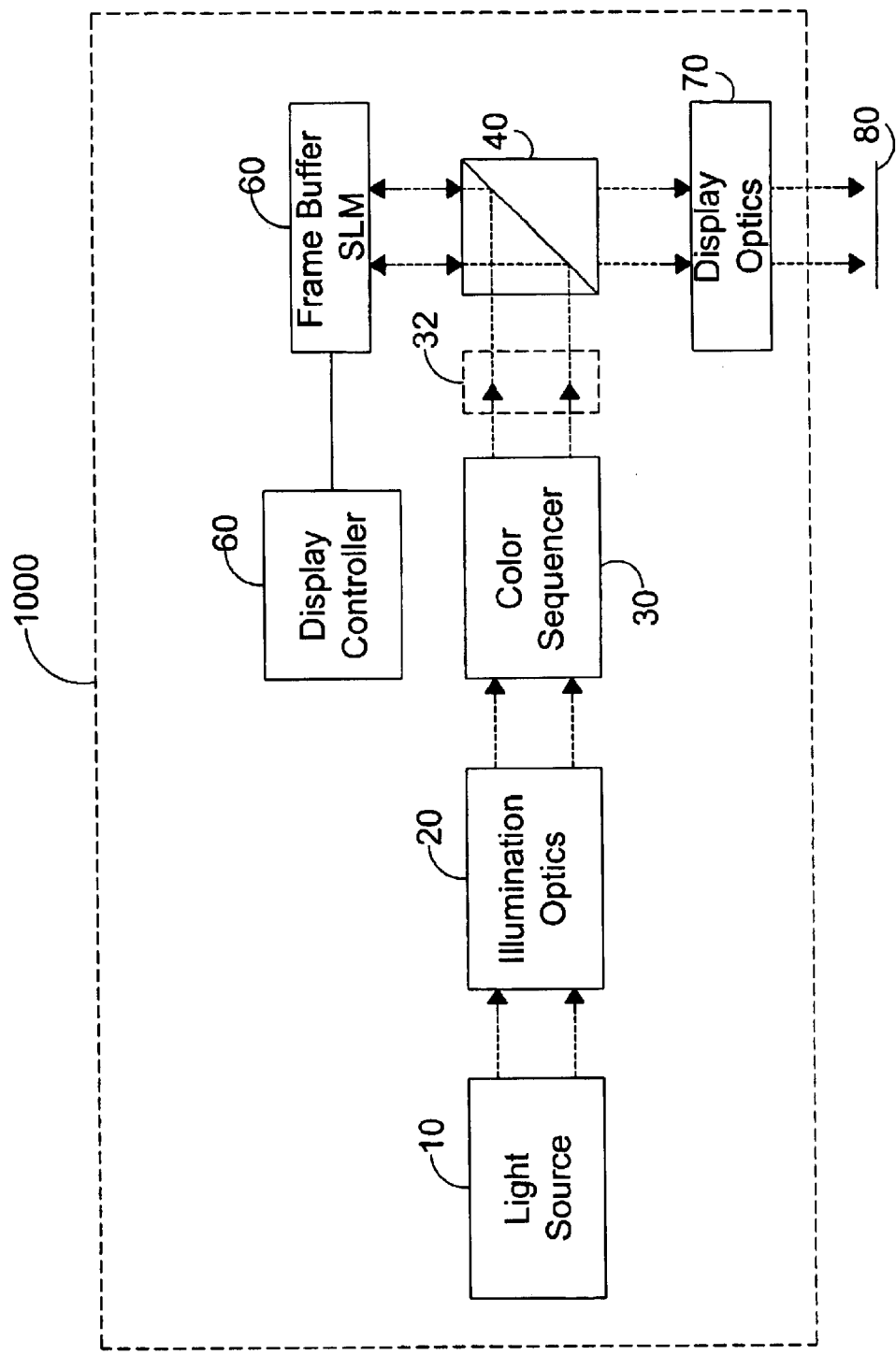
FIG. 1A is a schematic diagram of a first embodiment of a reflective single-panel field-sequential color display system, in accordance with the present invention.
Figure 1B:
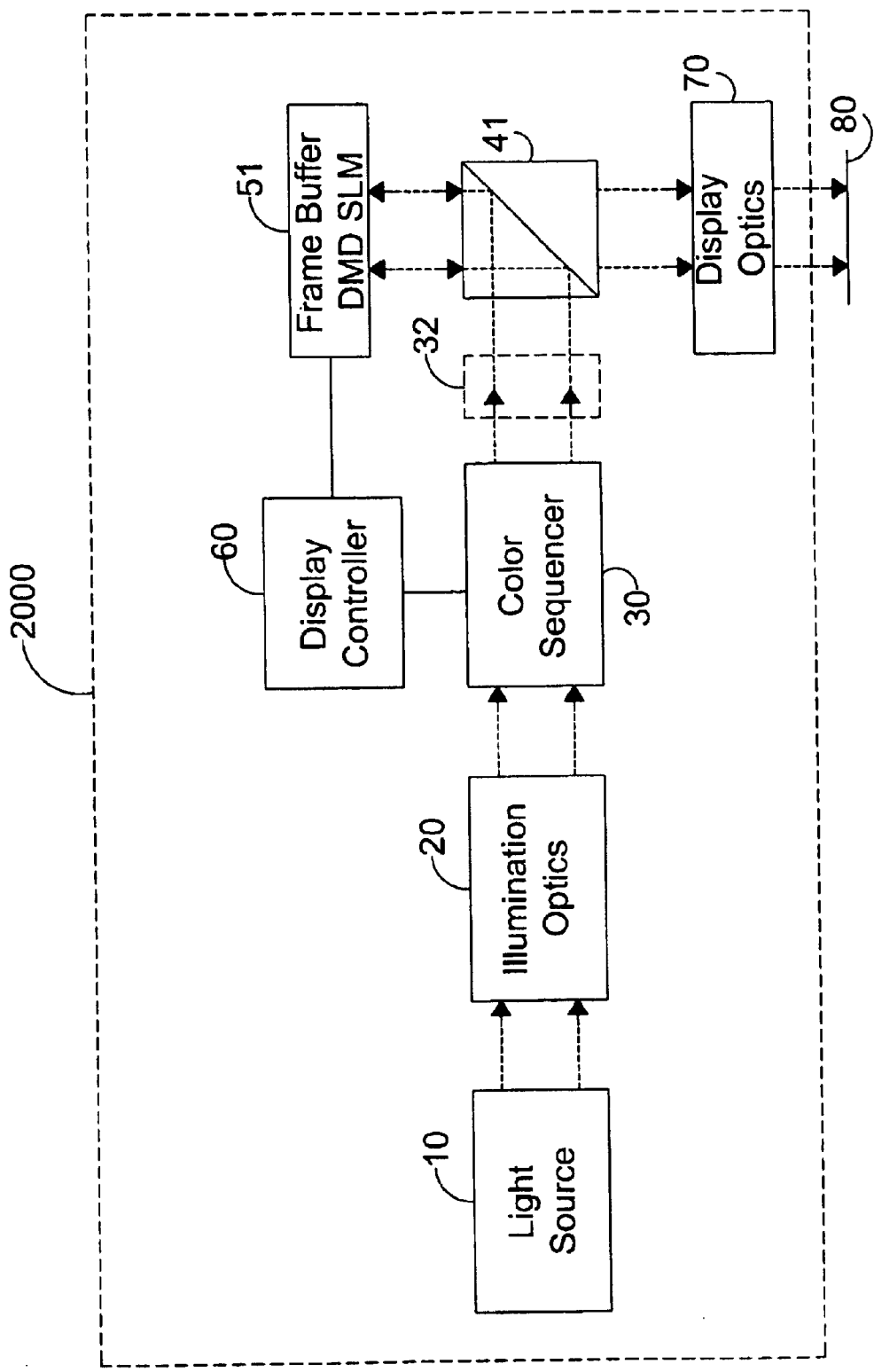
FIG. 1B is a schematic diagram of a fourth embodiment of a reflective single-panel field-sequential color display system, in accordance with the present invention.
Figure 1C:
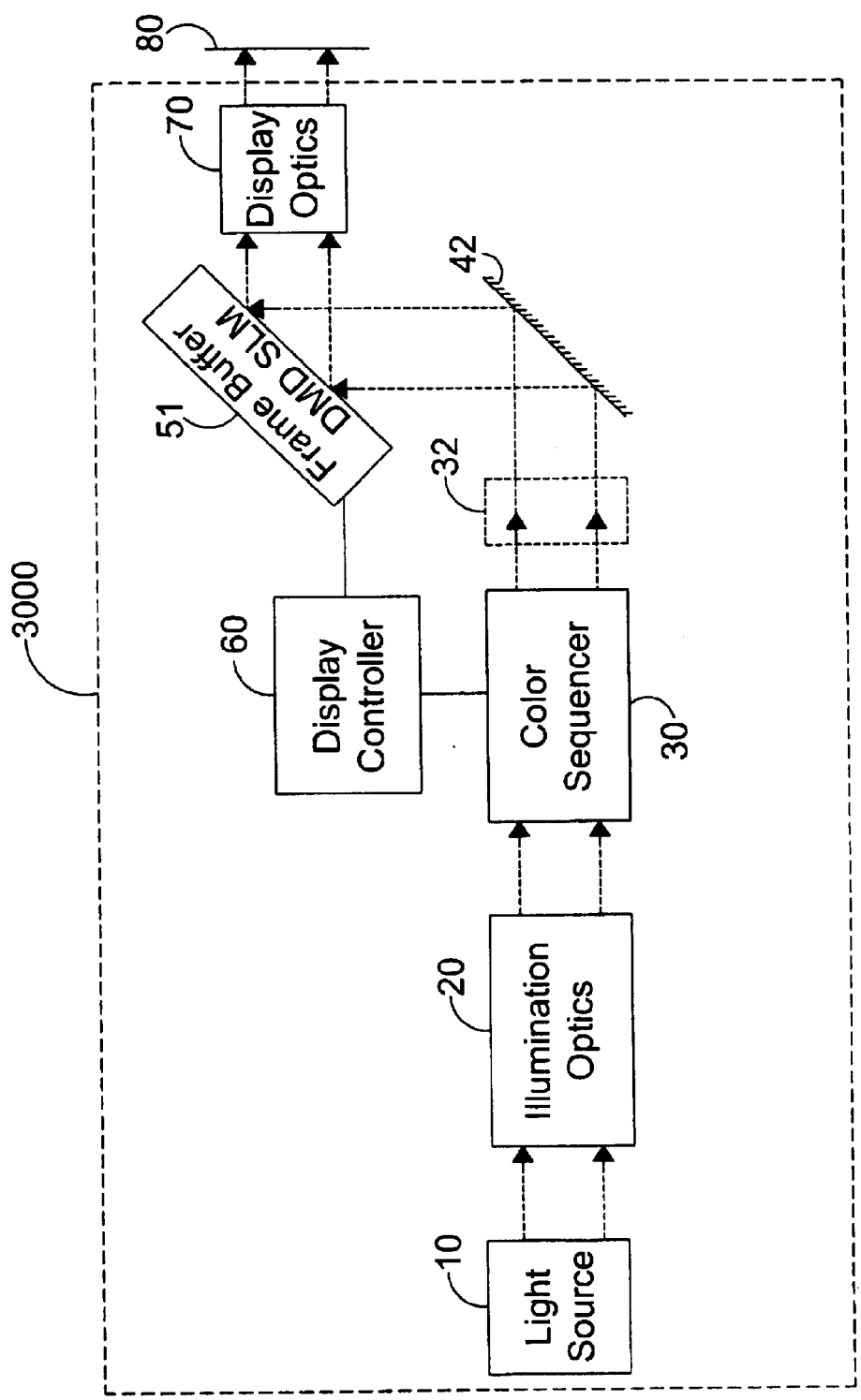
FIG. 1C is a schematic diagram of a third embodiment of a reflective single-panel field-sequential color display system, in accordance with the present invention.

FIG. 1A–1C illustrate reflective embodiments of the single-panel field-sequential color display system of the present invention. The reflective embodiment of FIG. 1A comprises a light source 10, illumination optics 20, a color sequencer 30, an optional tristimulus filter 32, a polarizing beamsplitter 40, a reflective frame buffer spatial light modulator (SLM) 50, display controller 60, display optics 70 and a display screen 80.

The light source 10 is preferably a lamp, suitably a metal halide lamp, a tungsten lamp, or a halogen lamp, and preferably emits optical power in all three primary color bands. Alternatively, the light source 10 can be implemented light source that emits optical power in all three primary color bands. A tristimulus filter 32 may be positioned after the color sequencer 30 to filter out unwanted cyan and yellow interband light.

Light from the light source 10 passes through the illumination optics 20 and is directed to the color sequencer 30. The color sequencer 30 sequentially transmits color bands (i.e., spectrums) of the light from the light source 10, e.g., the three primary additive color bands.

Light from the color sequencer 30 is directed to the polarizing beamsplitter 40 and is polarized such that the polarizing beamsplitter 40 reflects the light from the color sequencer 30 towards the reflective frame buffer spatial light modulator 50.

The reflective frame buffer spatial light modulator 50 polarization modulates the light in accordance with image information from the display controller 60, and reflects the polarization modulated light back towards the polarizing beamsplitter 40. The polarizing beamsplitter 40 passes components of the light reflectived from the frame buffer spatial light modulator 50 that are orthogonally polarized with respect to the light that was reflected from the polarizing beamsplitter 40 towards the frame buffer spatial light modulator 50. The light passed by the polarizing beamsplitter 40 is imaged on the display screen 80 by display optics 70.

The display controller 60 controls the color sequencer 30 and the frame buffer spatial light modulator 50 so that the frame buffer spatial light modulator 50 is sequentially driven with color image information, e.g., red, green and blue image information, in synchronism with color illumination from the light source 10 and the color sequencer 30, e.g., red, green and blue illumination.

The display system of FIG. 1A can be implemented as a front projection display, in which the display screen 80 is viewed from the same side as the display optics 70, or as a rear projection display, in which the display screen 80 is viewed from the side opposite the display optics 70.

The frame buffer spatial light modulator 50 is preferably a spatial light modulator with an integrated frame buffer pixel circuit. The frame buffer pixel circuit that is integrated into the spatial light modulator is preferably of the type described in detail in co-pending U.S. patent application Ser. No. 08/605,999, filed Feb. 9, 1996, in U.S. Pat. No. 5,767, 828, issued on Jun. 16, 1998, and in International Application No. PCT/US96/11532 (International Publication No. WO 97/04436), all of which are incorporated herein by reference in their entirety. The frame buffer pixel circuit integrated into the frame buffer spatial light modulator is adapted to store an entire image frame before displaying that image frame. Other "frame buffer" circuits, such as the one described in U.S. Pat. No. 5,566,010 to Ishii et al. and which is incorporated herein by reference in its entirety, may possibly be used in the frame buffer spatial light modulator 50.

The frame buffer spatial light modulator 50 is preferably a liquid crystal based spatial light modulator, but other types of spatial light modulators, e.g., a digital mirror device PMD) or a deformable grating device, can be used. An embodiment that utilizes a DMD spatial light modulator is shown in FIG. 1B, and will be described in more detail below.

Suitable liquid crystal devices include ferroelectric liquid crystal devices, smectic A* and smectic C* liquid crystal devices, distorted helix ferroelectric (DHF antiferroelectric) liquid crystal devices, achiral ferroelectric liquid crystal devices, electrically-controlled birefringence (ECB) liquid crystal devices, hybrid aligned nematic (HAN) liquid crystal devices, vertically aligned nematic SAN) liquid crystal devices, pi-cell or soft-mode effect liquid crystal devices, and twisted liquid crystal devices. Some examples of twisted liquid crystal devices include 45° twisted nematic CFN), 63° twisted effect, mixed mode TN and reflective mode TN. The liquid crystal device used should be fast enough for field-sequential operation.

The color sequencer 30 can be any device that sequentially transmits different color spectrums. For example, the color sequencer 30 can be suitably implemented with a color wheel, with the tunable color filter described in Y. Wang, "Surface Plasmon Tunable Color Filter and Display Device," Society for Information Display International Symposium Digest of Technical Papers, Vol. 28, pp. 63–66, or with the tunable filter disclosed in U.S. Pat. No. 5,689, 317, issued on Nov. 18, 1997, all of which are incorporated herein by reference in their entirety. However, the color sequencer 30 is preferably one of the opto-electronic color sequencers/filters described in co-pending U.S. patent application Ser. No. 09/126,330, filed Jul. 31, 1998, or U.S. Pat. No. 08/853,468, filed May 9, 1997, and U.S. Pat. No. 08/645,580, filed May 14, 1996, (now U.S. Pat. No. 5,822, 021) or one of the color sequencers/filters described in U.S. Pat. No. 5,751,384, issued on May 12, 1998. The above-listed U.S. Patent and U.S. Patent Applications are incorporated herein by reference in their entirety. The operation and fabrication of the preferred opto-electronic color sequencer is described in detail in the above-listed patent and patent applications.

Compared to an electro-mechanical color sequencer, such as a color wheel, the preferred opto-electronic color sequencers can run with a reduced selection of colors (e.g., red and green only, or blue only), improving display brightness. In contrast, a color wheel will lose optical throughput when accomplishing the same task. Furthermore, with the preferred opto-electronic color sequencers, color planes can be randomized, which reduces flicker and other color sequential artifacts, and temporal modulation can be employed to increase the light in one color channel over the other color channels. In addition, with the preferred opto-electronic color sequencers, the brightness as well as the time duration of a color can be modulated to perform color balancing in order to produce a variable color temperature lamp, and also to match different electronic projection system color standards.

Furthermore, color wheels consume more power than the preferred opto-electronic color sequencers because a mechanical motor must be driven to spin the color wheel. If the color wheel stops spinning due to a malfunction, the brightness of the lamp may be sufficient to shatter the color wheel. This problem is not present with the preferred opto-electronic color sequencers. Because the preferred opto-electronic color sequencers contain no mechanical moving parts, they are more reliable and compact than electro-mechanical-color sequencers. Furthermore, the preferred opto-electronic color sequencers can be of arbitrary size, without losing light due to the time over which the display is blanked between colors to ensure maximizing color saturation.

In addition, with specialized software capable of determining the color content of the data to be displayed on the frame buffer SLM 50, the preferred opto-electronic color sequencers may be used to display a mixture of colors. For example, if the image data is primarily comprised of cyan, magenta and white pixels, the opto-electronic color sequencer may cycle through cyan, magenta and white in synchronism with cyan, magenta and white data being programmed onto the frame buffer SLM 50. This would result in the doubling of the brightness of the projection system. Furthermore, the opto-electronic sequencer could be divided into subsections. Each subsection can display different amounts of red, green, blue, cyan, magenta, yellow and white or black in synchronism with color blocks of image data stored on the frame buffer SLM 50 or programmed onto 50, thus further increasing the system brightness.

The preferred opto-electronic color sequencers require at least partially polarized input light for operation. Accordingly, if an opto-electronic color sequencer is used as the color sequencer 30, the illumination optics 20 should include a polarizer or a polarization recovery system for at least partially polarizing the light from the light source 10.

In addition, the preferred opto-electronic color sequencers generally require an output analyzing polarizer to transmit color-filtered light. In the embodiment of FIG. 1A, the polarizing beamsplitter 40 preferably also functions as the output analyzing polarizer for the color sequencer 30, if one of the preferred opto-electronic color sequencer is used.

Depending upon the specific configuration of the opto-electronic color sequencer, the input polarization state required by the color sequencer 30 could be either linear, circular or elliptical. Accordingly, if a polarizer is used as part of the illumination optics 20, it could be either a linear, circular or elliptical polarizer, depending upon the configuration of the color sequencer 30. The polarizer can be neutral or it can exhibit a wavelength-dependent polarization.

Polarizer materials are available in a number of forms, the selection of which depends upon the application requirements. Suitable polarizers include absorption-based polarizers, e.g., crystal dichroism long chain molecules of dye or iodine, and oriented in metal particles (e.g., Polarcor product, Corning, Inc.), multilayer films (e.g., DBEF Transmax product, 3M, Inc.), birefringent (e.g., calcite, or quartz-based Ahrens, Wollaston, Rochon, Nicol or Glen polarizers). Other types of polarizers include scatter polarizers using rough surfaces (Yamaguti) or liquid crystal in a polymer matrix, reflection (e.g., cholesteric liquid crystal, multilayers on 45° prisms, coated prismatic) and periodic structures (e.g., coated gratings, slits, wires, or oriented silver or copper particles such as Polarcor product and polarizers from Corning, Inc.).

A disadvantage of using a standard polarizer in the illumination optics 20 is that, if a randomly or only partially polarized light source 10 is used, a significant portion of the available light from the light source 10 is blocked by the polarizer. Accordingly, a polarization conversion system is preferably used in the illumination optics 20 as will be described in more detail below.

The polarizing beamsplitter 40 is suitably implemented with a polarizing beamsplitter cube, dual brightness enhanced films by 3M, a Transmax™, polarizer a polarizing beamsplitter by Merck, Inc., or a rhomboid beamsplitter.

FIG. 1B illustrates a second reflective embodiment of the single-panel field-sequential color display system of the present invention. The display system of FIG. 1B is similar to the display system of FIG. 1A, except that a frame buffer DMD SLM 51 is used in place of the frame buffer SLM 50 of FIG. 1A. The operation of the light source 10, illumination optics 20, and color sequencer 30 in the display system of FIG. 1B is the same as that described above in connection with the display system of FIG. 1A.

The operation of the DMD SLM 51 is well known in the art. The DMD SLM selectively reflects light incident on it in accordance with image information from the display controller 60. The DMD SLM 51 does not rotate the polarization of the light it reflects. Accordingly, the polarizing beamsplitter 40 of FIG. 1A is replaced with a total internal reflection (TIR) optical element 41 in the display system of FIG. 1B. The TIR optical element 41 reflects light from the color sequencer 30 towards the DMD SLM 51, but transmits light reflected off the DMD SLM 51 using geometrical angles and the different indices of refraction between TIR optical element 41 and air. In the embodiment of FIG. 1B, the DMD SLM 51 includes an integrated frame buffer pixel circuit, and is adapted to selectively reflect light back towards the TIR optical element 41.

FIG. 1C illustrates a third reflective embodiment of the single-panel field-sequential color display system of the present invention. The display system of FIG. 1C is similar to the display system of FIG. 1B, except that the frame buffer DMD SLM 51 is adapted to selectively reflect light incident on it at an off-axis angle. Thus, the TIR optical element 41 in the display system of FIG. 1B is replaced with mirror 42, which directs light from the color sequencer 30 to the frame buffer DMD SLM 51. The frame buffer DMD SLM 51 selectively reflects light towards the display optics 70, in accordance with image information from the display controller 60. It should be noted that mirror 42 could be replaced by frame buffer DMD SLM 51 followed by display optics 70 which would yield a display output direction which is perpendicular to the direction of display shown in FIG. 1C. This similarly holds for the embodiments shown in FIGS. 1B and 1C or any other embodiments presented herein.

Figure 2:
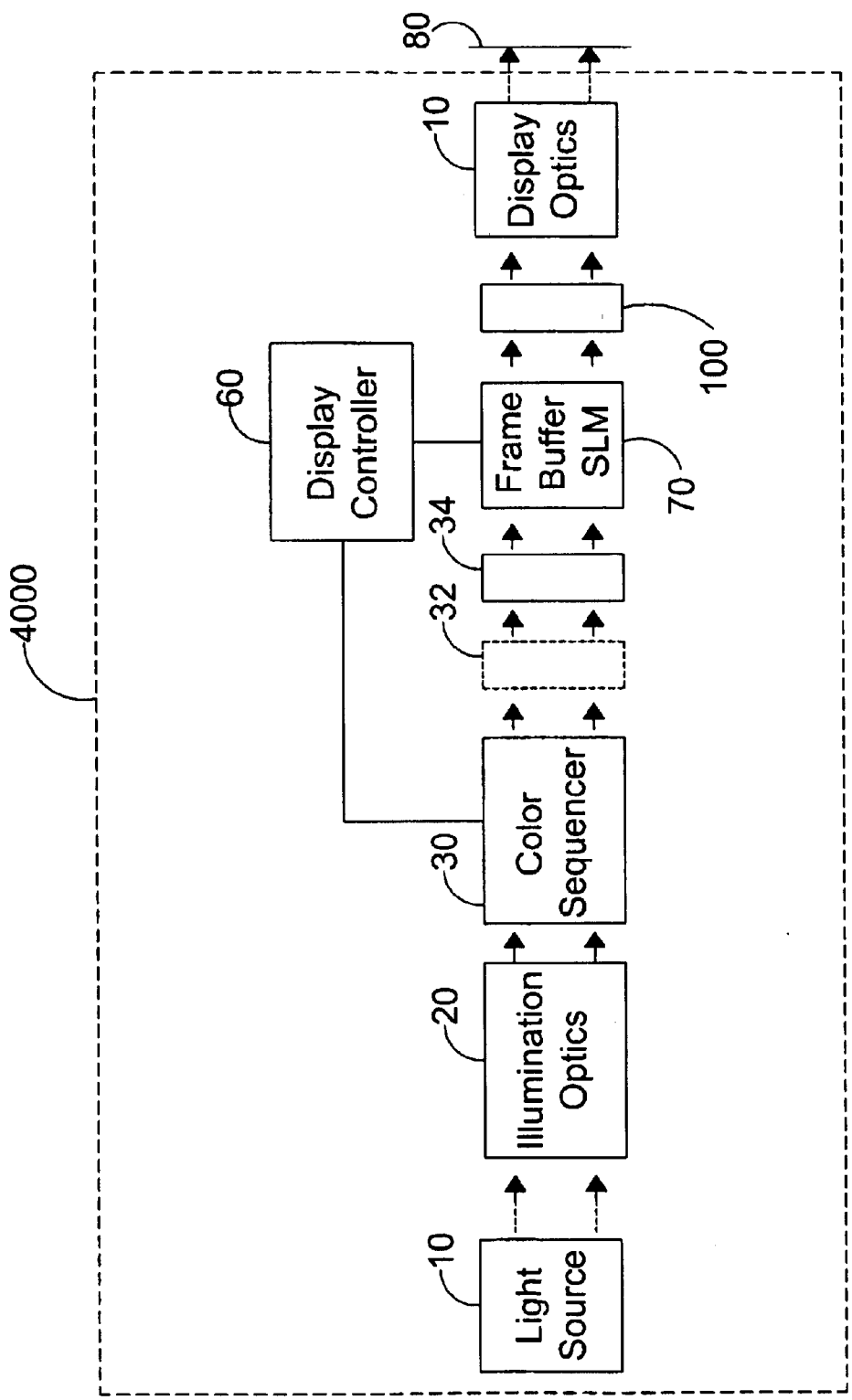
FIG. 2 is a schematic diagram of a first embodiment of a transmissive single-panel field-sequential color display system, in accordance with the present invention.

FIG. 2 illustrates a first transmissive embodiment of the single-panel field-sequential color display system of the present invention. The display system of FIG. 2 is similar to the display system of FIG. 1A, except that a transmissive frame buffer spatial light modulator 90 is used instead of the reflective frame buffer spatial light modulator 50 of FIG. 1A.

The operation of the light source 10, illumination optics 20, and color sequencer 30 in the display system of FIG. 2 is the same as that described above in connection with the display systems of FIGS. 1A–1C. However, in the display system of FIG. 2, the transmissive frame buffer SLM 90 is positioned after the color sequencer 30, and a polarizer 100 is positioned after the frame buffer SLM 90, if the frame buffer SLM 90 is of the type that polarization modulates incident light. In addition, a microlens array 34 is preferably positioned between the color sequencer 30 and the transmissive frame buffer SLM 100. The transistors in the frame buffer circuit of the transmissive frame buffer SLM 90 reduce the clear aperture of the frame buffer SLM 90. The microlens array 34 is used to focus the light from the color sequencer 30 through the pixels in the transmissive frame buffer SLM 90, thus achieving a nearly 100% fill factor.

The transmissive frame buffer spatial light modulator 90 modulates the input light in accordance with image information from the display controller 60. If the frame buffer SLM 90 polarization modulates the input light, then a polarizer 100 is positioned after the frame buffer SLM 90 to analyze the polarization of the light from the frame buffer SLM 90. The light that is transmitted by the polarizer 100 is imaged on the display screen 80 by the display optics 70.

As in the display systems of FIGS. 1A–1C, the display controller 60 controls the color sequencer 30 and the transmissive frame buffer spatial light modulator 90 so that the frame buffer SLM 90 is sequentially driven with red, green and blue image information in synchronism with red, green and blue illumination from the light source 10 and the color sequencer 30. Like the display systems of FIGS. 1A–1C, the transmissive frame buffer spatial light modulator 90 has an integrated frame buffer circuit that is adapted to store an entire image frame prior to displaying that image frame.

The display system of FIG. 2 can be implemented as a front projection display, in which the display screen 80 is viewed from the same side as the display optics 70, or as a rear projection display, in which the display screen 80 is viewed from the side opposite the display optics 70.

Figure 3A:
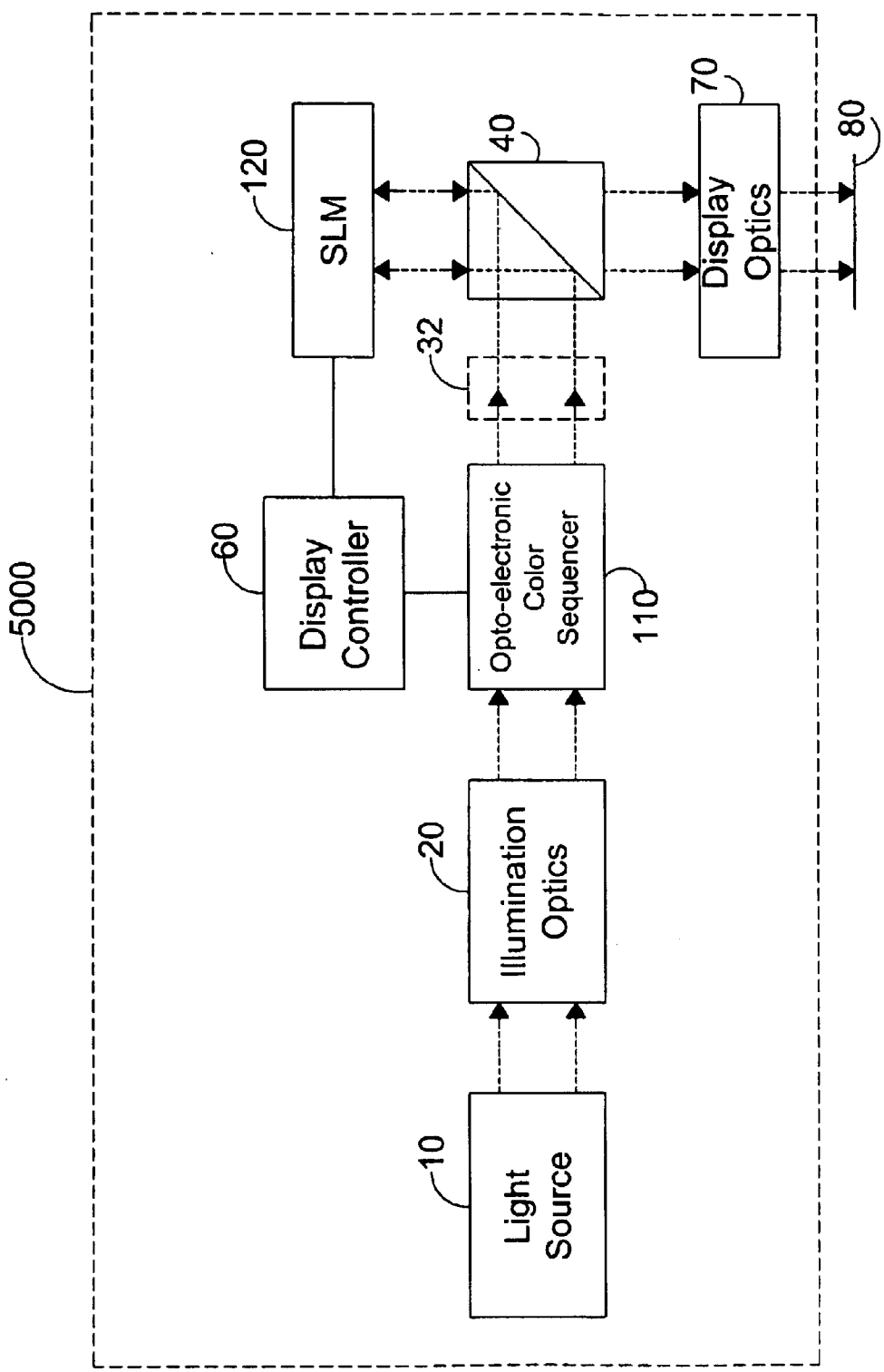
FIG. 3A is a schematic diagram of a fourth embodiment of a reflective single-panel field-sequential color display system, in accordance the present invention.
Figure 3B:
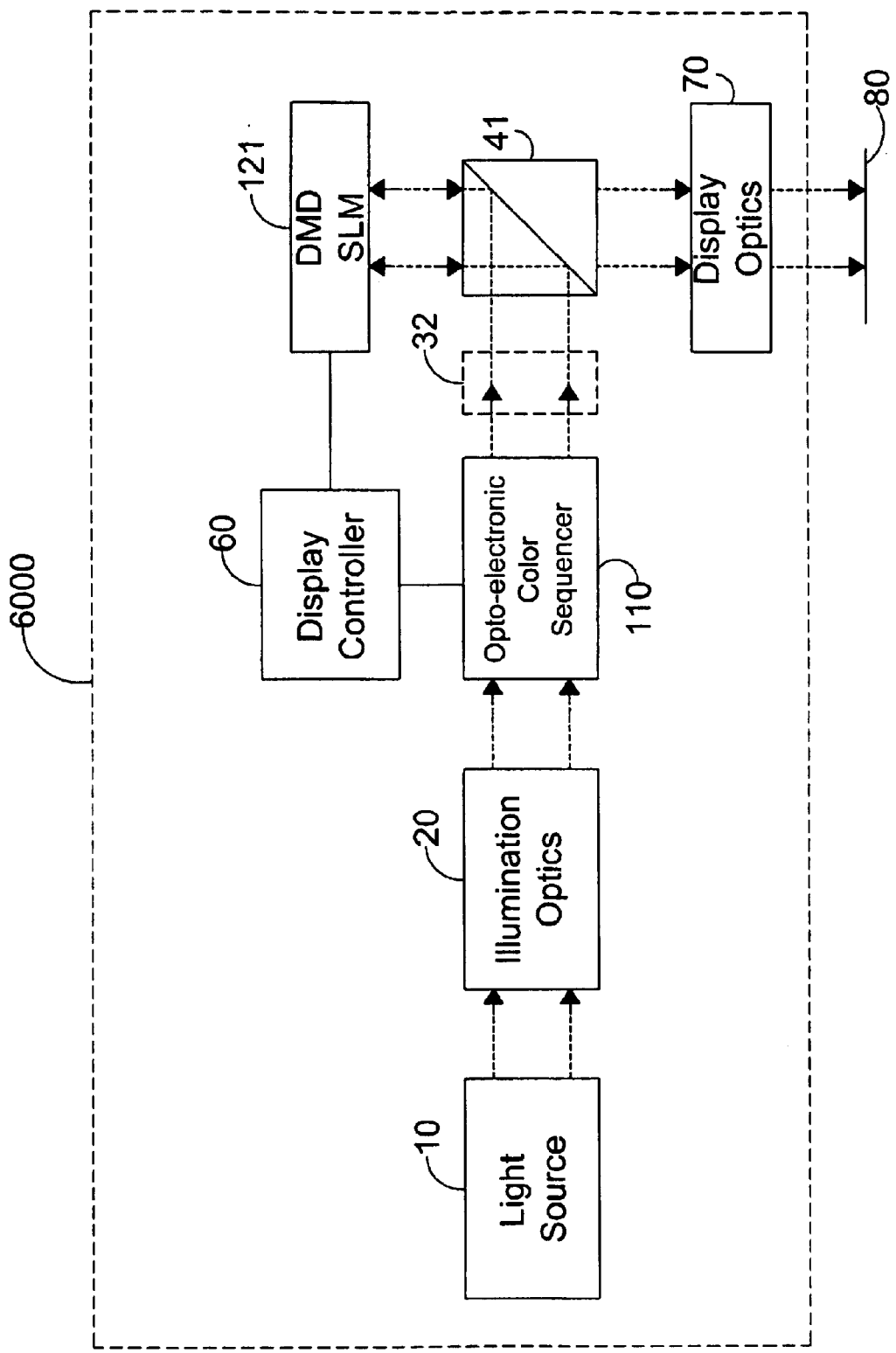
FIG. 3B is a schematic diagram of a fifth embodiment of a reflective single-panel field-sequential color display system, in accordance the present invention.
Figure 3C:
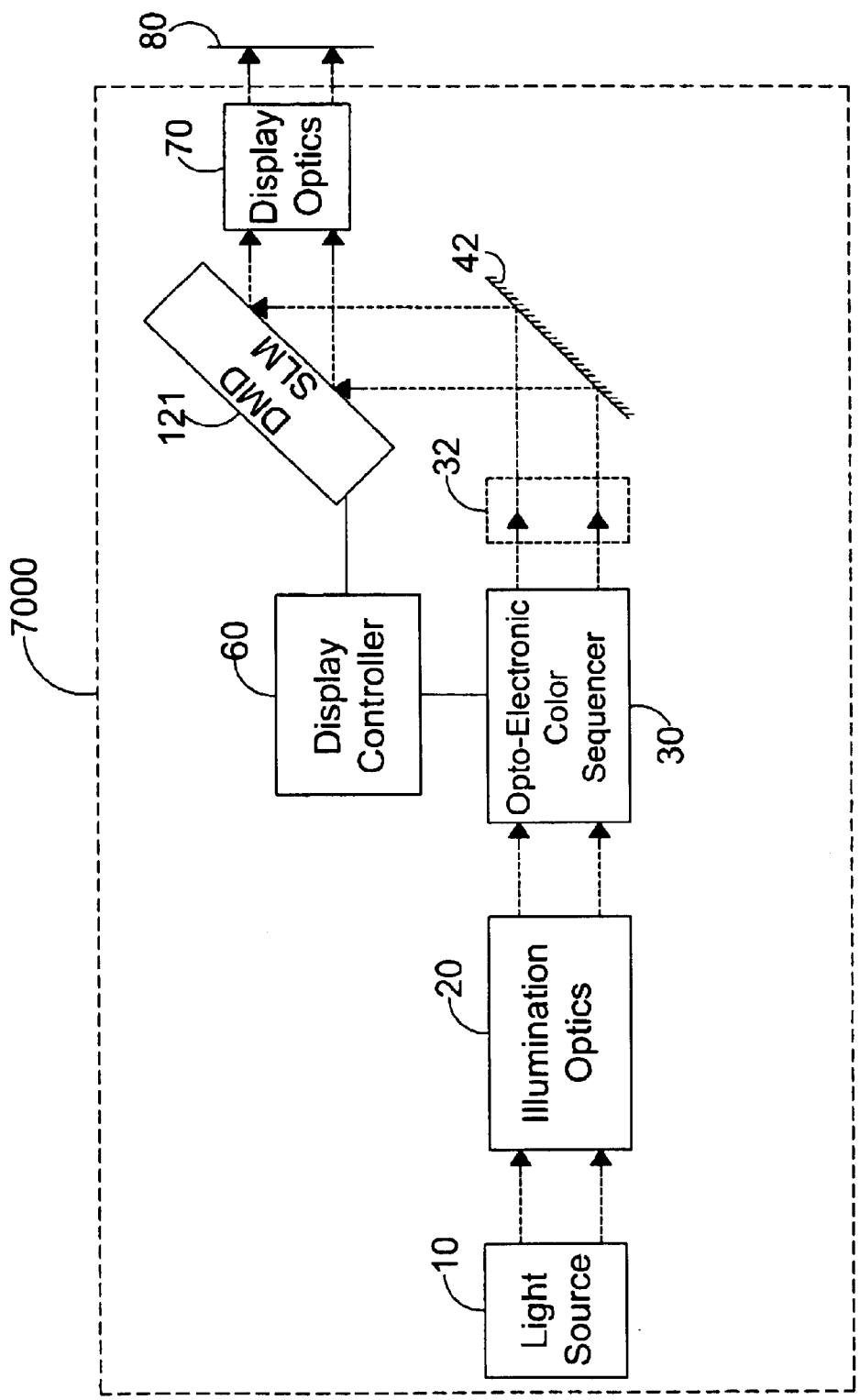
FIG. 3C is a schematic diagram of a sixth embodiment of a reflective single-panel field-sequential color display system, in accordance the present invention.

FIGS. 3A–3C illustrate additional reflective embodiments of the single-panel field-sequential color display system of the present invention. The display system of FIG. 3A, 3B and 3C are similar to the display systems of FIGS. 1A, 1B and 1C, respectively, except that the display systems of FIGS. 3A–3C utilize an opto-electronic color sequencer 110 in combination with any type of reflective SLM 120, including a DMD SLM 121, that modulates light in accordance with image information from the display controller 60. Although any type of reflective spatial light modulator 120, 121 that modulates light can be used, a reflective frame buffer SLM, such as the one described above in connection with the display systems of FIGS. 1A–1C, is preferably used, especially for if the SLM is an analog SLM. The display systems of FIG. 3A–3C operate in a manner similar to the display systems of FIGS. 1A–1C.

Figure 4:
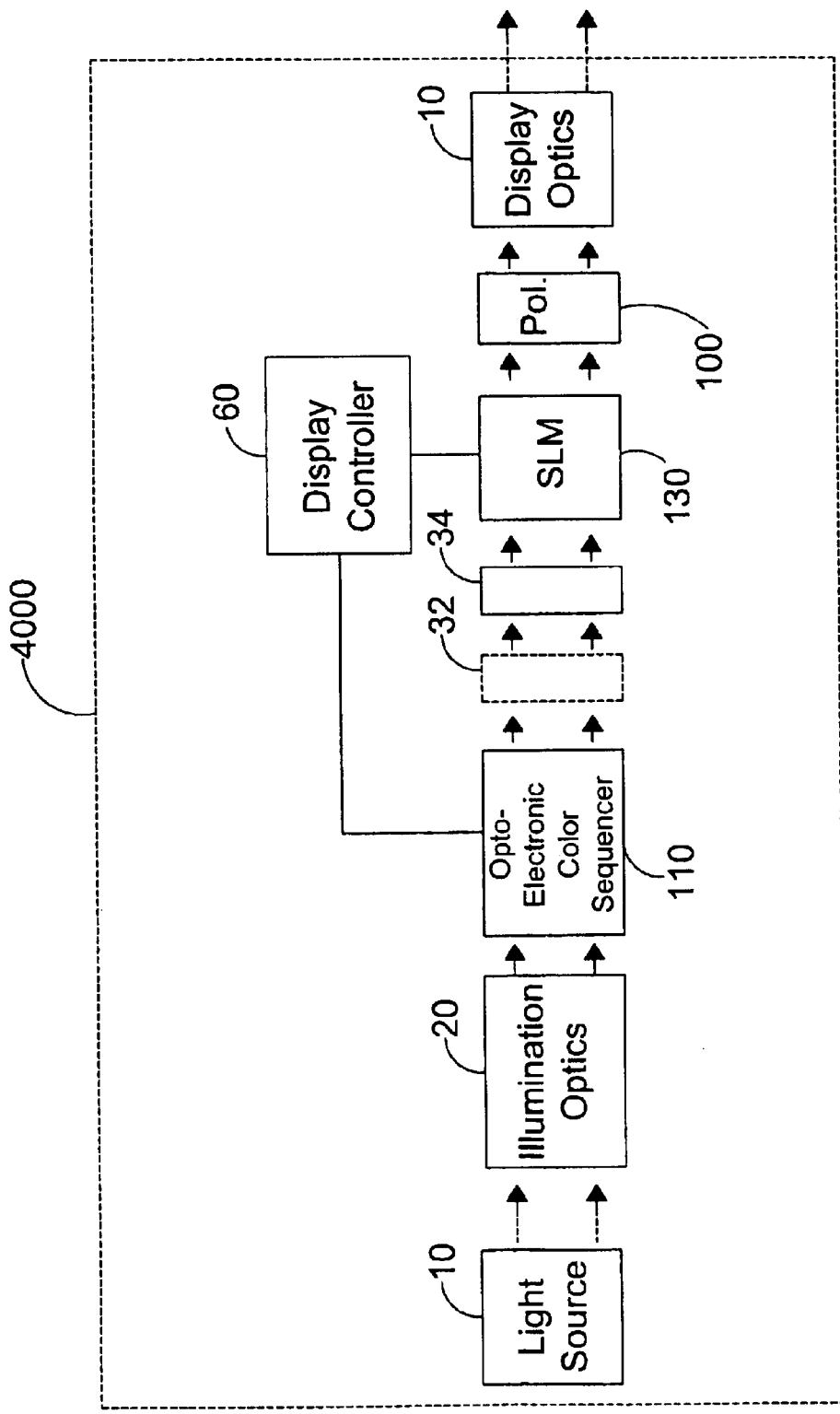
FIG. 4 is a schematic diagram of a second embodiment of a transmissive single-panel field-sequential color display system, in accordance with the present invention.

FIG. 4 illustrates a second transmissive embodiment of the single-panel field-sequential display system of the present invention. The layout of the display system of FIG. 4 is the same as the layout of the display system of FIG. 2, except that an opto-electronic color sequencer 110 is used with any type of transmissive SLM 130.

Specifically, any type of transmissive SLM 130 that modulates light in accordance with image information from the display controller 60 is used. The spatial light modulator 130 is positioned after the opto-electronic color sequencer 110. A microlens array 34 is preferably positioned between the opto-electronic color sequencer 110 and the transmissive SLM 130, in order to improve the fill factor, as discussed above in connection with the system of FIG. 2. Light from the opto-electronic color sequencer 110 is modulated by the spatial light modulator 130 in accordance with image information from the display controller 60. If the SLM 130 polarization modulates the light from the opto-electronic color sequencer 110, then a polarizer 100 is positioned after the SLM 130 to analyze the polarization of the light from the spatial light modulator 130. The light transmitted by the polarizer 100 is imaged on the display screen 80 by the display optics 70.

Figure 5:
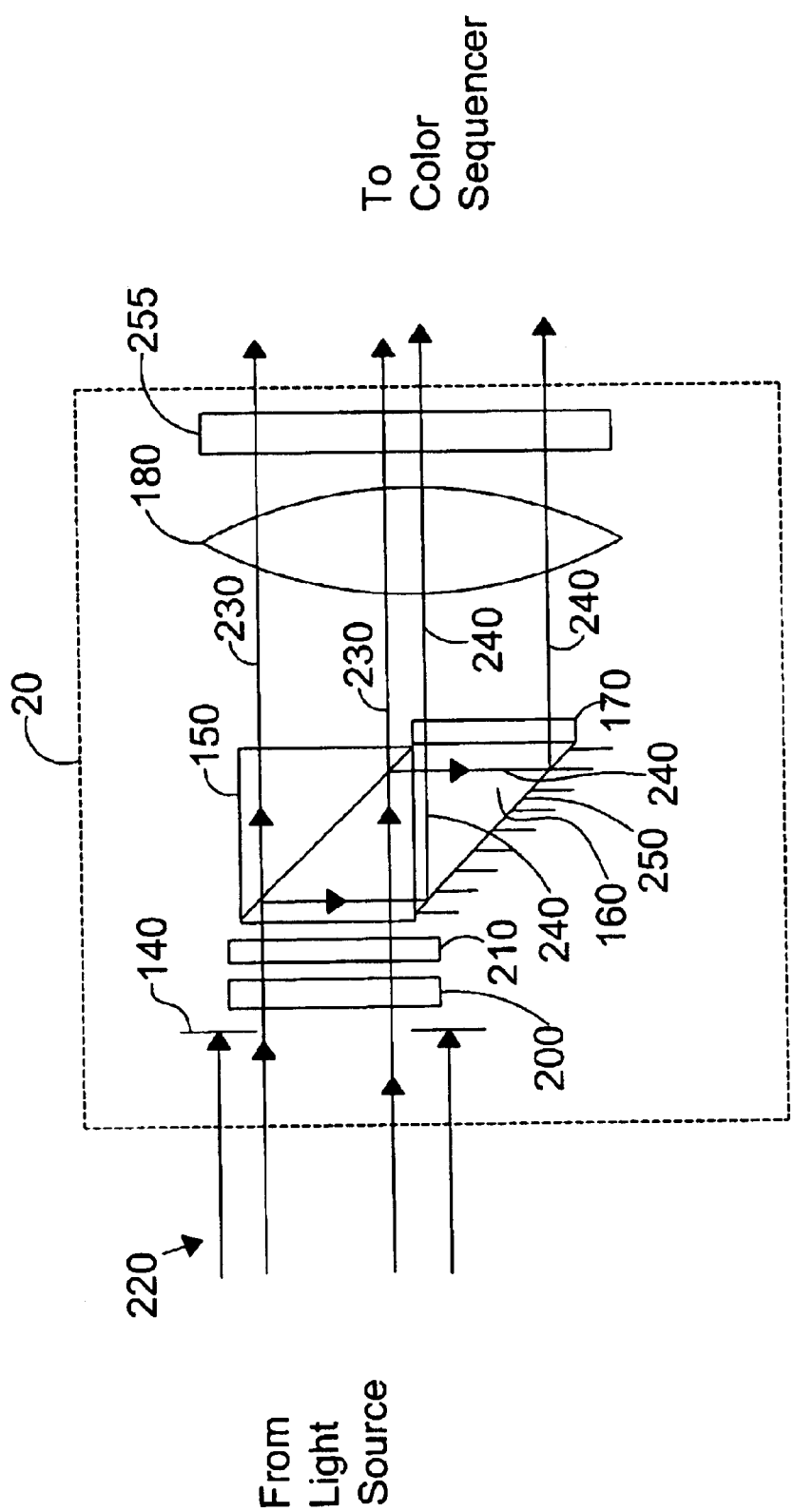
FIG. 5 is a schematic diagram of a first preferred embodiment of illumination optics used in the display systems of FIGS. 1–4, 7 and 8.

Since, opto-electronic color sequencer 110 is used, the illumination optics 20 should include a polarizer or polarization conversion system for at least partially polarizing the light from the light source 10. FIG. 5 illustrates a first preferred embodiment of the illumination optics 20 that can be used with any of the above-described display systems.

The illumination optics 20 of FIG. 5 function as a polarization conversion system and comprise an aperture 140, a polarizing beamsplitter 150, a right angle prism 160 positioned next to one exit port of the polarizing beamsplitter 150, an achromatic halfwave plate 170 positioned next to the output port of the right angle prism 160, and a condenser lens 180. Alternatively, the achromatic halfwave plate 170 may be placed next to the exit port of the polarizing beamsplitter 150. An optional ultraviolet filter 200 and an optional infrared filter 210 may be positioned between the aperture 140 and polarizing beamsplitter 150 to filter out unwanted ultraviolet and infrared light.

In operation, light 220 from the light source 10 passes through the aperture 140, and is filtered if the optional ultraviolet and infrared filters 200 and 210 are present. The function of the aperture 140 is to prevent light 220 from leaking around the polarizing beamsplitter 150, which would produce unwanted background light and reduce the contrast ratio of the system.

The polarizing beamsplitter 150 receives the light 220, transmits one polarization state 230 and reflects an orthogonal polarization state 240. The transmitted polarization state 230 passes through the condenser lens 180, and is directed to the color sequencer 30. The function of the condenser lens 180 is to substantially collimate the light transmitted to the color sequencer 30.

The reflected orthogonal polarization state 240 enters the right angle prism 160 and is reflected by the right angle prism towards the achromatic halfwave plate 170. The achromatic halfwave plate 170 rotates the polarization state of the reflected light 240 by 90° so that the polarization state is collinear with the polarization state of the transmitted light 230. The reflected light 240 passes through the condenser lens 180 and is directed to the color sequencer 30. An optional polarizer 255 can be used to block any residual light that does not have the desired polarization. The optional polarizer is preferably positioned after the condenser lens 180, but it may also be placed before the condenser lens 180.

The reflecting surface 250 of the right angle prism 160 is suitably implemented with a dielectric surface or a metal surface. Alternatively, the right angle prism 160 may be designed so that light is reflected off the reflecting face 250 via total internal reflection. The achromatic halfwave retarder 170 is suitably fabricated from quartz, mica, calcite, stretched polymer retarders or liquid crystal polymer films.

Figure 6:
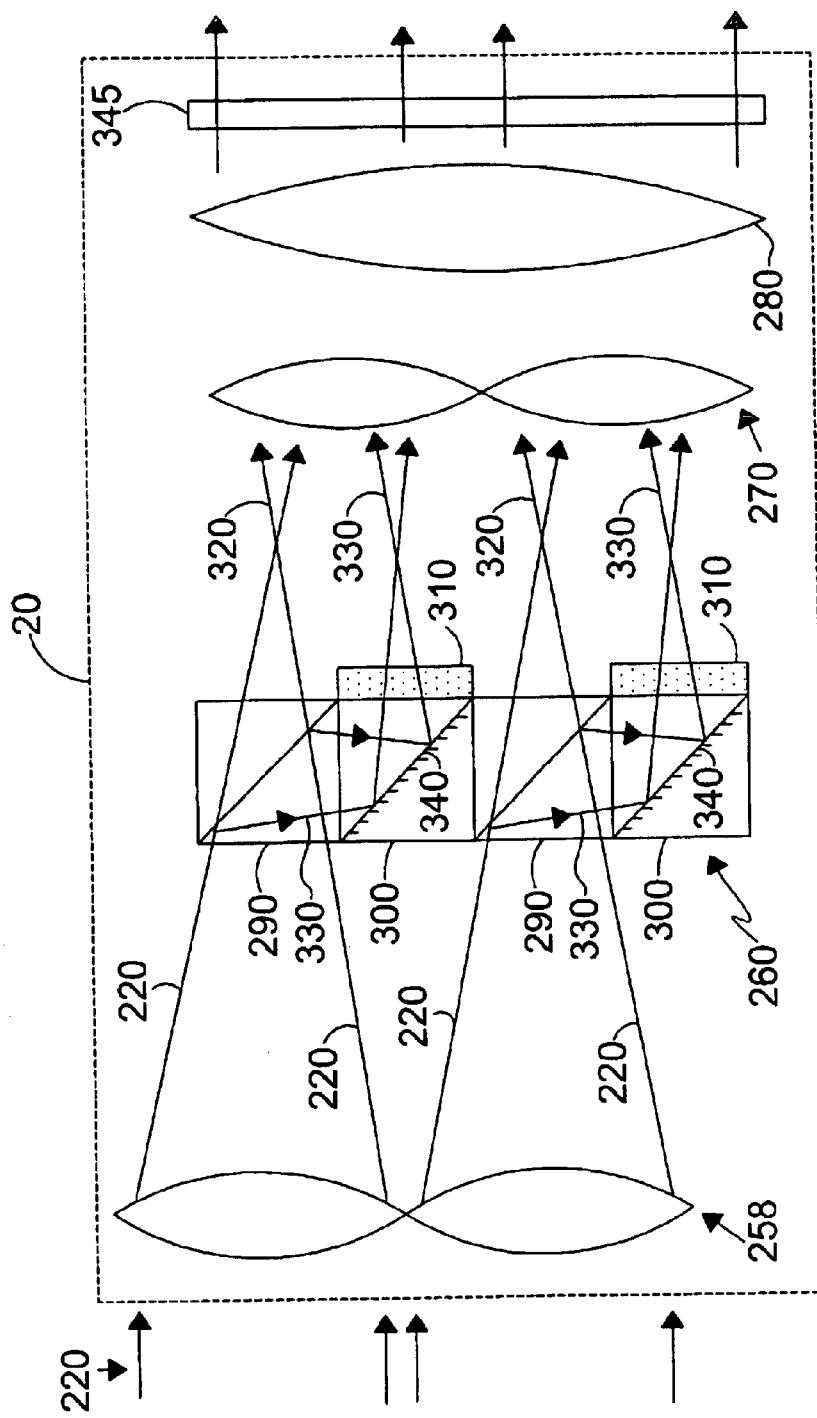
FIG. 6 is schematic diagram of a second preferred embodiment of illumination optics used in the display systems of FIGS. 1–4, 7 and 8.

FIG. 6 illustrates a second preferred embodiment of the illumination optics 20 used in the above-described display systems. The illumination optics 20 of FIG. 6 is similar to the system described in Itoh, et al. "Ultra-High Efficiency LC Projector Using a Polarized Light Illuminating System," Society for Information Display International Symposium Digest of Technical Papers, Vol. 28, pp.994–996 (1997).

The illumination optics 20 of FIG. 6 comprise a first microlens array 258, a polarizing beamsplitter array 260, a second microlens array 270 and a condenser lens 280. Each "unit" of the polarizing beamsplitter array 260 comprises a polarizing beamsplitter 290, a beamsplitter cube 300 positioned adjacent to one of the output ports of the polarizing beamsplitter 290, and an achromatic halfwave plate 310 positioned at the output port of the beamsplitter cube 300.

In operation, light 220 from the light source 10 is focused by the first microlens array 258 onto the array of polarizing beamsplitters 260. Each polarizing beamsplitter 290 transmits a portion 320 of the input light 220 and reflects another portion 330 towards a reflecting surface 340 of the beamsplitter cube 300. The transmitted light 320 has one polarization state and the reflected portion 330 has an orthogonal polarization state. The reflecting surface 340 again reflects the reflected portion 330 towards the achromatic halfwave plate 310. The achromatic halfwave plate 310 rotates the polarization state of the reflected light portion 330 by 90° so that its polarization state is collinear with the polarization state of the transmitted light portion 320. The second microlens array 270 and the condenser lens 280 receive the transmitted and reflected light portions 320 and 330, and together substantially collimate the light and transmit the light to the color sequencer 30. An optional polarizer 345 can be used to block any residual light that does not have the desired polarization. The optional polarizer 345 is preferably positioned after the condenser lens 280, but it may also be positioned between the lens array 270 and the condenser lens 280.

Figure 7:
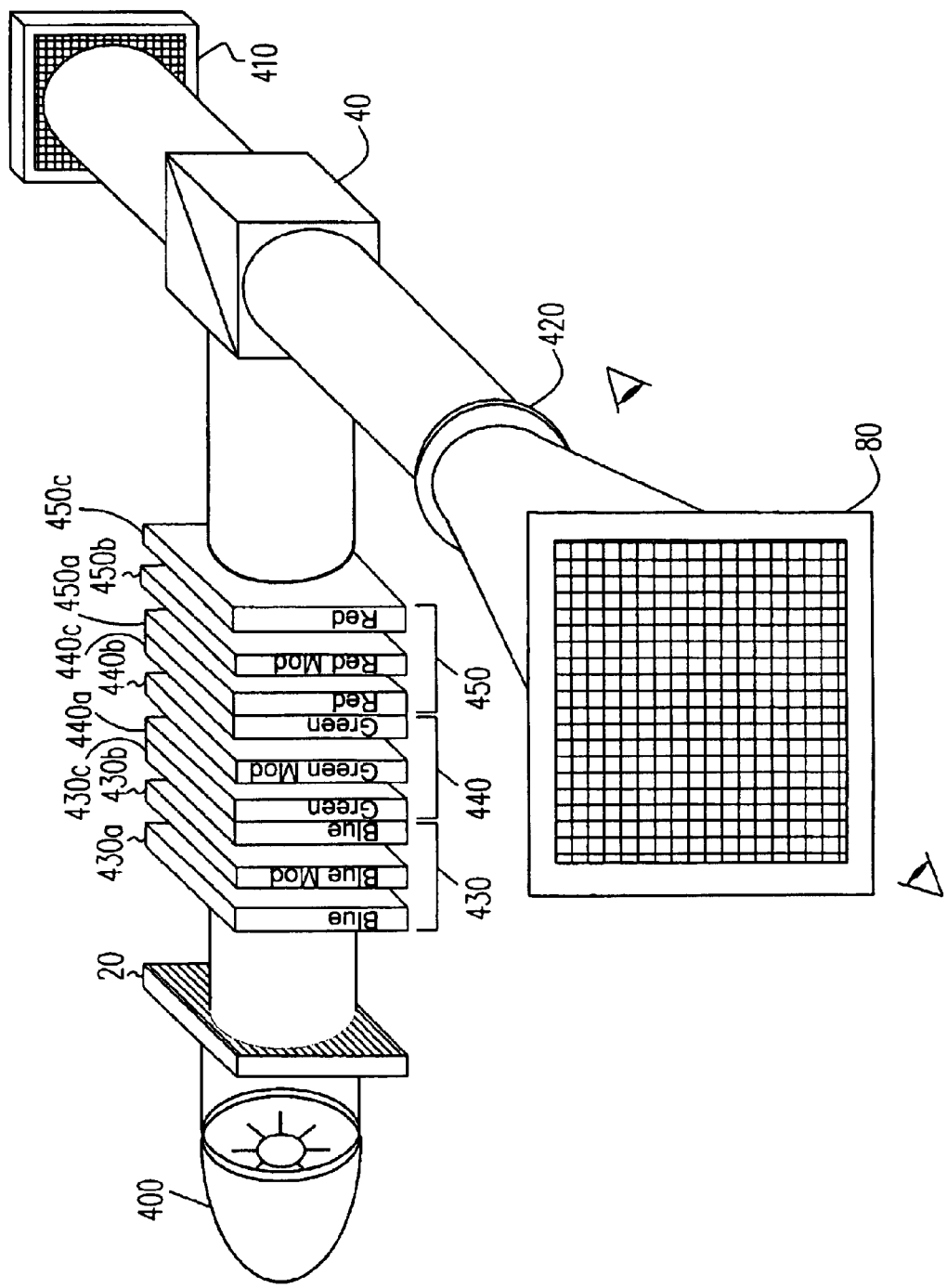
FIG. 7 is a schematic diagram of a reflective single-panel field-sequential projection system, in accordance with the present invention.

FIG. 7 illustrates a single-panel field-sequential projector system utilizing a reflective liquid spatial light modulator, in accordance with the present invention. The projection system of FIG. 7 comprises a lamp system 400, illumination optics 20, an opto-electronic color sequencer 110 a polarizing beamsplitter 40, a reflective liquid crystal spatial light modulator 410, a projection lens 420 and a display screen 80.

The fabrication and operation of the opto-electronic color sequencer 110 is described in detail in co-pending U.S. patent application Ser. Nos. 09/126,330 and 08/853,468, in U.S. Pat. No. 5,751,384 and in International Application No. PCT/US97/08290 (International Publication No. WO97/43862), all of which are incorporated herein by reference in their entirety. The opto-electronic color sequencer 110 is adapted to receive at least partially polarized input light, and comprises a blue stage 430, a green stage 440 and a red stage 450.

The blue stage 430 comprises a first retarder stack 430a, an LC modulator 430b and a second retarder stack 430c. The green stage 440 comprises a first retarder stack 440a, an LC modulator 440b and second retarder stack 440c. The red stage 450 comprises a first retarder stack 450a, an LC modulator 450b and second retarder stack 450c. The second retarder stack 430c in the blue stage 430 and the first retarder stack 440a in the green stage 440 can optionally be combined into one retarder stack. Some or all of the LC modulators 440a, 440b and 440c may optionally include a film (not shown) that exhibits a negative birefringence in the z-direction (the light propagation direction) for improving the field-of-view of the color sequencer 110. A suitable negative birefringence film is a VAC film available commercially from Sumitomo.

If the lamp system 400 outputs unpolarized light, the illumination optics 20 are preferably implemented with a polarization conversion system, such as the polarization conversion system shown in FIG. 5 or FIG. 6, described above. In this way, the unpolarized light from the lamp system 400 is converted into linearly polarized light with substantially no light loss. Although the polarization conversion systems of FIG. 5 and 6 are preferred, any other polarization conversion system may be used.

The polarizing beamsplitter 40 functions as both an output polarizer for the opto-electronic color sequencer 110, and as the input/output polarizer for the reflective liquid crystal spatial light modulator 410.

In operation, light from the lamp system 400 passes through the illumination optics 20 and enters the opto-electronic color sequencer 110. The opto-electronic color sequencer can independently modulate the transmission of red, green and blue light in response to controls signals from the display controller 60 (not shown in FIG. 7). Light output by the opto-electronic color sequencer 110 exits polarized such that the selected color is reflected towards the reflective liquid crystal spatial light modulator 410 by the polarizing beamsplitter 40. The reflective liquid crystal spatial light modulator 410 polarization modulates the light in accordance with image information from the display controller 60, and reflects the polarization modulated light back towards the polarizing beamsplitter 40. The polarizing beamsplitter 40 passes components of the light reflected from the spatial light modulator 410 that are orthogonally polarized with respect to the light that was reflected from the polarizing beamsplitter 40 towards the spatial light modulator 410. Accordingly, image information is imaged by the projection lens 420 onto the display screen 80. The spatial light modulator 410 is sequentially driven with red, green and blue image information in synchronism with the red, green and blue illumination from the lamp system 400 and the color sequencer 110. Although the projection system is described as as a red, green and blue based system, other colors, such as cyan, magenta, yellow and white, could also be transmitted by the opto-electronic color sequencer 110 and still fall within the scope of the present invention.

The projector system of FIG. 7 can be implemented as a front projection display, in which the display screen 80 is viewed from the same side as the projection lens 420, or as a rear projection display, in which the display screen 80 is viewed from the side opposite the projection lens 420.

Figure 8:
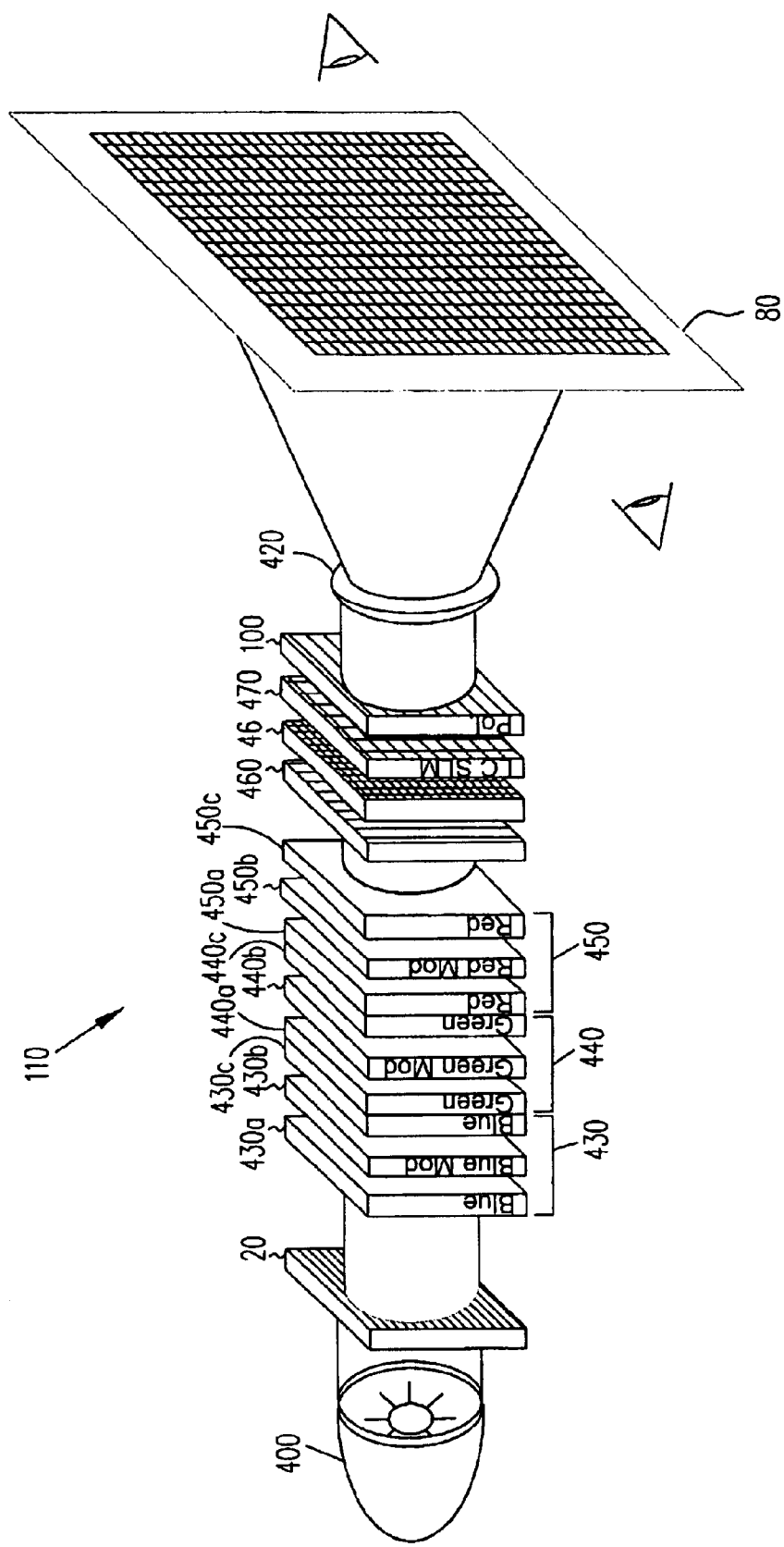
FIG. 8 is a schematic diagram of a transmissive single-panel field-sequential projection system, in accordance with the present invention.

FIG. 8 shows a single-panel field-sequential projection system implemented with a transmissive liquid crystal spatial light modulator, in accordance with the present invention. The projection system of FIG. 8 is similar to the projection system of FIG. 7, except that a transmissive liquid crystal SLM 470 is used instead of a reflective liquid crystal spatial light modulator. In this configuration, the opto-electronic color sequencer 110 includes an output polarizer 460, and a microlens array 462 is positioned between the opto-electronic color sequencer 110 and the transmissive SLM 470. The microlens array 462 is used to focus light from the opto-electronic color sequencer 110 through the pixels in the transmissive SLM 470.

In operation, the lamp system 400 and the opto-electronic color sequencer 110 sequentially illuminates the transmissive liquid crystal spatial light modulator 470 with red, green and blue light. The spatial light modulator 470 is sequentially driven with red, green and blue image information in synchronism with the red, green and blue illumination from the lamp system 400 and color sequencer 110. The liquid crystal spatial light modulator 470, in combination with the polarizer 100, modulates the intensity of the light that is imaged onto the display screen 80 by the projection lens 420, in accordance with the image information. Like the projection system of FIG. 7, the projection system of FIG. 8 can implemented as a front projection display or a rear projection display.

In the projection systems of FIGS. 7 and 8, the lamp system 400 is preferably a metal halide lamp and preferably emits optical power in all three primary color bands. Alternatively, the lamp system 400 can be implemented with an active lamp system or a lamp/color wheel combination.

In the projection systems shown in FIGS. 7 and 8, the opto-electronic color sequencer 110 is positioned between the lamp 400 and the spatial light modulators (410 in FIG. 7 and 470 in FIG. 8). However, the opto-electronic color sequencer 110 can be positioned at other locations in the projection systems, provided that it effectively controls the illuminating color at the output, i.e., the display screen 80.

By placing the opto-electronic color sequencer between the lamp 400 and the spatial light modulator 410 or 470, the image at the display screen 80 is less sensitive to any wavefront distortion caused by the opto-electronic color sequencer 110.

The opto-electronic color sequencer 110 is preferably driven using a three-level drive scheme, as described in co-pending U.S. patent application Ser. No. 09/126,330.

The liquid crystal spatial light modulators 410 and 470 are preferably implemented with liquid crystal on silicon (LCOS) technology, but they can also be implemented with any other type of transmissive liquid crystal technology, e.g., crystalline silicon, poly TFT, amorphous silicon TFT, and others. The liquid crystal SLMs 410 and 470 preferably include an integrated frame buffer pixel circuit, as described in detail in co-pending U.S. patent application Ser. No. 08/605,999, and in U.S. Pat. No. 5,767,828.

Figure 9:
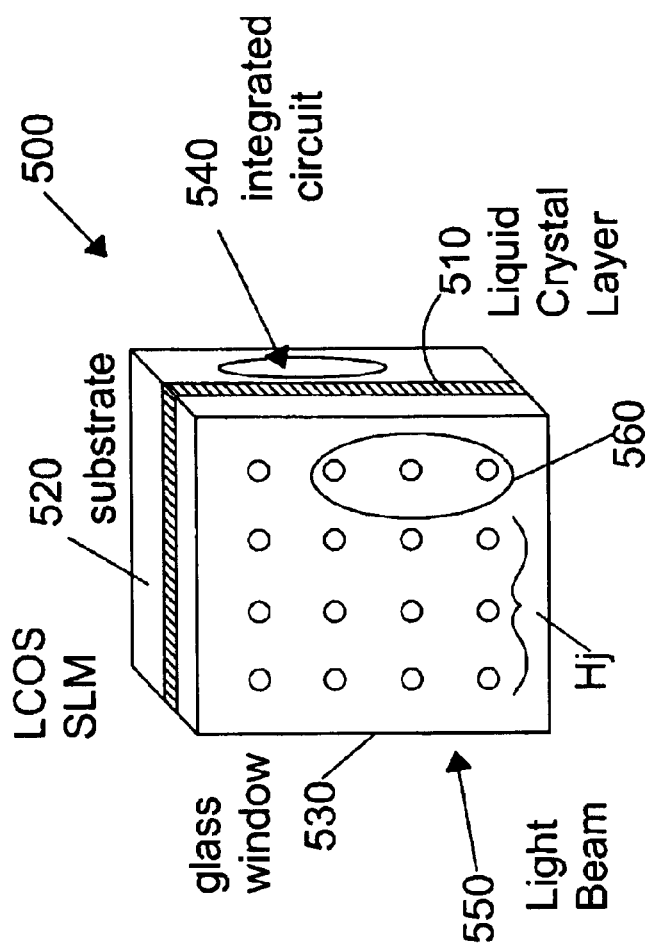

FIG. 9 shows a frame buffer LCOS spatial light modulator 500 that can be used as the reflective spatial light modulators (50, 120, and 410) or the transmissive spatial light modulators (90, 130 and 470) in the display systems described above. The LCOS spatial light modulator 500 includes a thin layer of liquid crystal 510 on a silicon substrate 520, which is covered by a glass window 530. The silicon substrate 520 includes an integrated circuit 540 with pixels Hj. Integrated circuit 540 is used to apply an electric field across the liquid crystal layer 510 in order to re-orient the liquid crystal and thereby modulate a light beam 550 that is either reflected from or transmitted through the substrate 520.

It should be noted that it is advantageous to update all pixels simultaneously for certain situations, such as facilitating DC balancing in drive schemes that utilize an electrical modulation of the cover glass transparent electrode voltage in the case of LC SLMs. Changes in the electrical data presented to the pixel electrodes can be synchronized with changes to the color glass voltage, thereby maximizing the efficiency of the drive scheme.

Table 1 below shows the tradeoff between resolution and pixel pitch for various applications, assuming a die size of less than 25.4 mm along the diagonal. This is important in that both DRAM and static pixel designs must fit within the pixel pitch.

TABLE 1

| Application | Resolution Format | Pixels | Pixel Pitch |
|---|---|---|---|
| Head Mounted Displays | SVGA | 800 × 600 | <25 μm |
| Data Projection | XGA | 1024 × 769 | <20 μm |
| Computer-Monitor | SXGA | 1280 × 1024 | <15 μm |
| Television | HDTV | 1920 × 1280 | <12 μm |

Figure 10:
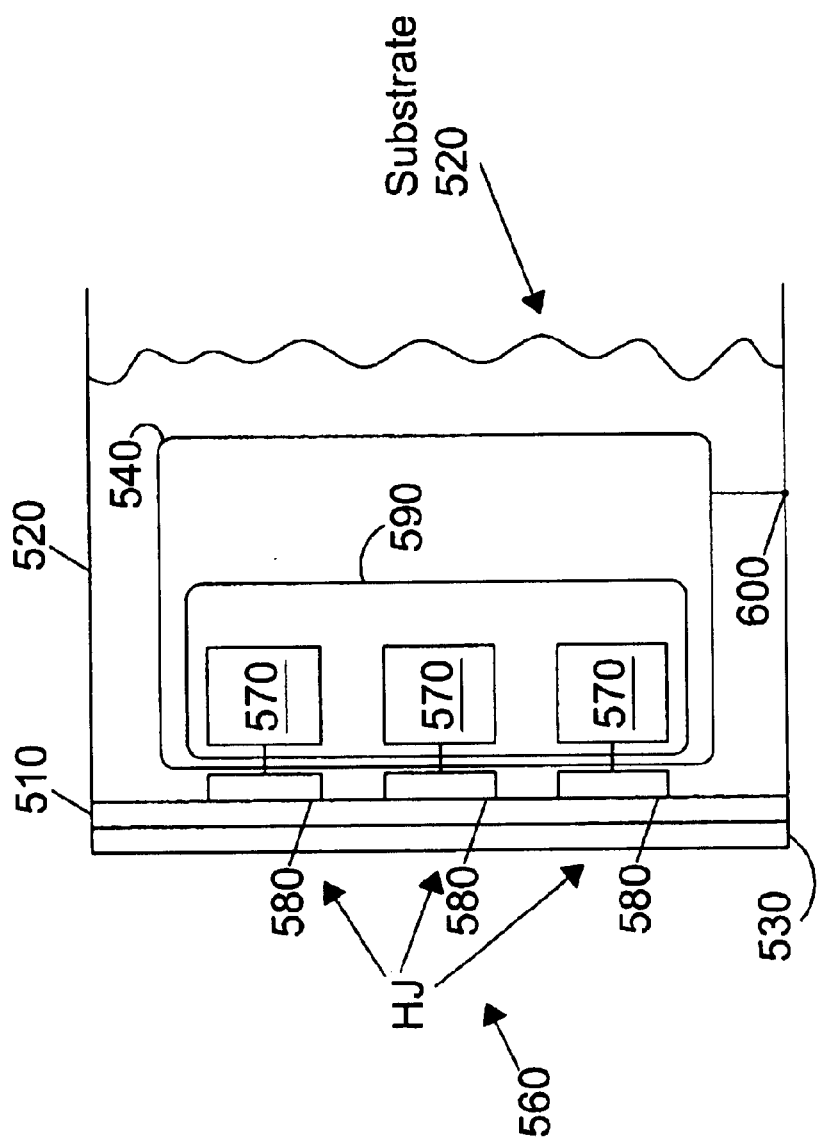
FIG. 10 is a schematic diagram of three representative pixels in the spatial light modulator of FIG. 9.

FIG. 10 shows a close-up view of a group of three pixels Hj, such as the three pixel group 560 shown in FIG. 9, as well as some of the associated electronics. Note that FIG. 10 is only a schematic representation of several pixels together with their associated electronics. In particular, a series of pixel buffers 570 are respectively coupled to liquid crystal driving electrodes 580 of the pixels Hj, and to integrated circuit 540. The entire group of pixel buffers 570 comprise an image buffer 590. A data input line 600 receives image data to be eventually displayed.

The LCOS spatial light modulator 500 operates as follows. New image data is received via data input line 600 by integrated circuit 540 and stored in frame buffer 590, but not yet applied to the liquid crystal layer 510. This allows the previous image to be viewed without it being gradually displaced by the new data. Once frame buffer 590 has been completely filled with the new data, that new data is simultaneously transferred from the pixel storage elements 570 to liquid crystal driving electrodes 580.

Note that the above scenario makes it possible to significantly reduce the time interval during which the displayed data is changing. For example, consider using an SXGA standard LCOS or DMD spatial light modulator with 1280× 1024 pixels, which addresses and begins to update the pixels a row-at-a-time. For a such a standard system, which may include 32 data wires running at 50 Mbits/second, it takes 800 microseconds to update an image. Without a frame buffer pixel circuit the time it takes the LCOS spatial light modulator 500 to replace the old image data with the new image data is limited by this update time and by the switching time of a liquid crystal device, which is approximately 100 microseconds. Note that pixels Hj are not necessarily static and that a dynamic type pixel approach may be preferable. However, with a frame buffer pixel circuit the image data can be switched nearly instantaneously across the liquid crystal layer, thereby increasing the view time of the display by 800 microseconds in this example.

Figure 11:
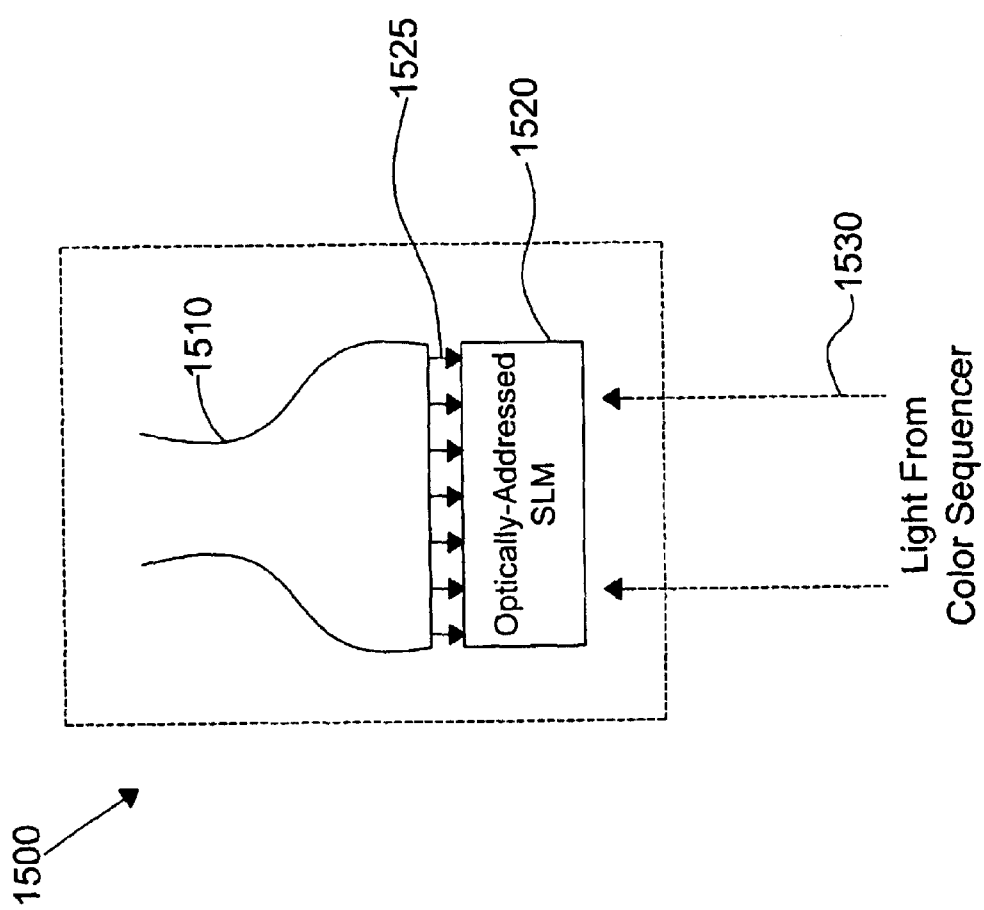
FIG. 11 is a schematic diagram of an optically-addressed spatial light modulator system that can be used as the reflective spatial light modulators in the display systems of FIGS. 1A–1C, 3A–3C and 7.

FIG. 11 shows an optically-addressed spatial light modulator (OASLM) system 1500 that can be used as the reflective spatial light modulators (50, 51, 120, 121 and 410) in the display systems described above. The OASLM system 1500 comprises an optical addressing device 1510 and an OASLM 1520. OASLM systems are well know in the art, and details regarding their operation will not be provided. In general, the display controller 60 (not shown) provides image information to the optical addressing device 1510. The optical addressing device 1510 optically addresses the OASLM 1520 with optical signal 1525 in accordance with the image information from the display controller. The OASLM receives light 1530 from the color sequencer (not shown) and modulates the light in accordance with the optical signal 1525. The OASLM 1520 either retro-reflects the modulated light (not shown) or reflects the modulated light at an off-axis angle, depending on which of the above-described reflective display embodiments the OASLM system 1500 is used in.

Figure 12:
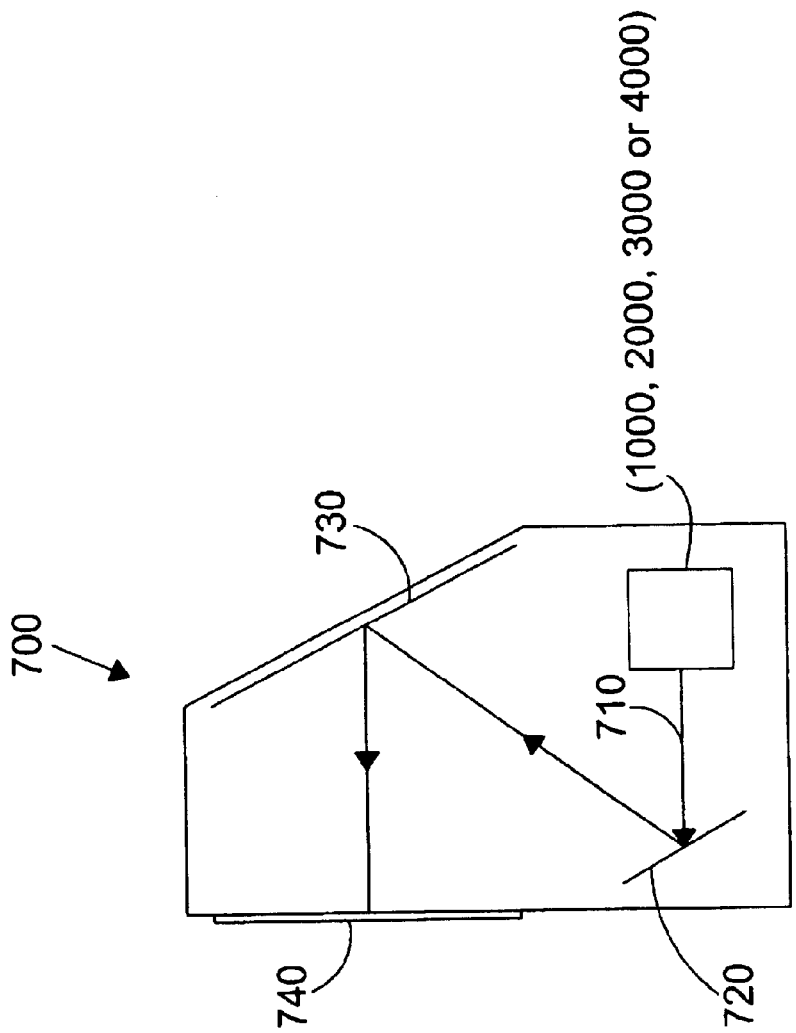
FIG. 12 is a schematic diagram of a rear projection system that utilizes the single-panel field-sequential display system of the present invention.

FIG. 12 illustrates a rear projection system 700 that incorporates the single-panel field-sequential color display system of the present invention. The rear projection system 700 can be used in rear projection computer monitors, television receivers, or any other rear projection display application.

The rear projection display system 700 includes the single-panel field-sequential color display system (1000, 2000, 3000 or 4000) shown in FIGS. 1, 2, 3 or 4. Light 710 from the single-panel field-sequential color display system is directed by mirror 720 and 730 to rear display screen 740. The mirror 720 is included to fold the optical path, thus making the overall system 700 more compact.

View Time and Brightness Issues

The projection system view time and brightness is dependent on the performance of the SLM and color sequencer. Accordingly, in order to optimize the performance of the display system, it is important to consider how the SLM and the color sequencer operate together.

Nematic liquid crystal SLMs exhibit asymmetric switching times, i.e., fast-turn-on times and slow turn-off times, or slow turn-on times and fast turn-off times. The asymmetry in the turn-on and turn-off response times of most nematic liquid crystal electro-optical effects can be understood as follows.

When the voltage is removed from a nematic LC spatial light modulator, the liquid crystal "free falls" to its original state (hereinafter the "slow transition") before it can be switched under the influence of an applied electric field to its new state (hereinafter the "fast transition"). Accordingly, the slow transition time is the important response time in the determining the throughput of nematic LC SLMs. In contrast, digital micromirror devices DMDs) and chiral smectic LC SLMs, including ferroelectric LC SLMs, exhibit symmetric switching times, i.e., fast turn-on times and fast turn-off times. Nematic SLMs are analog devices, while DMDs and smectic ferroelectric LC SLMs are generally binary devices. These key differences influence the display quality, including the color depth, i.e., the number of bits of grey-scale per color, and the brightness, which is a function of the image view time.

Figure 13:
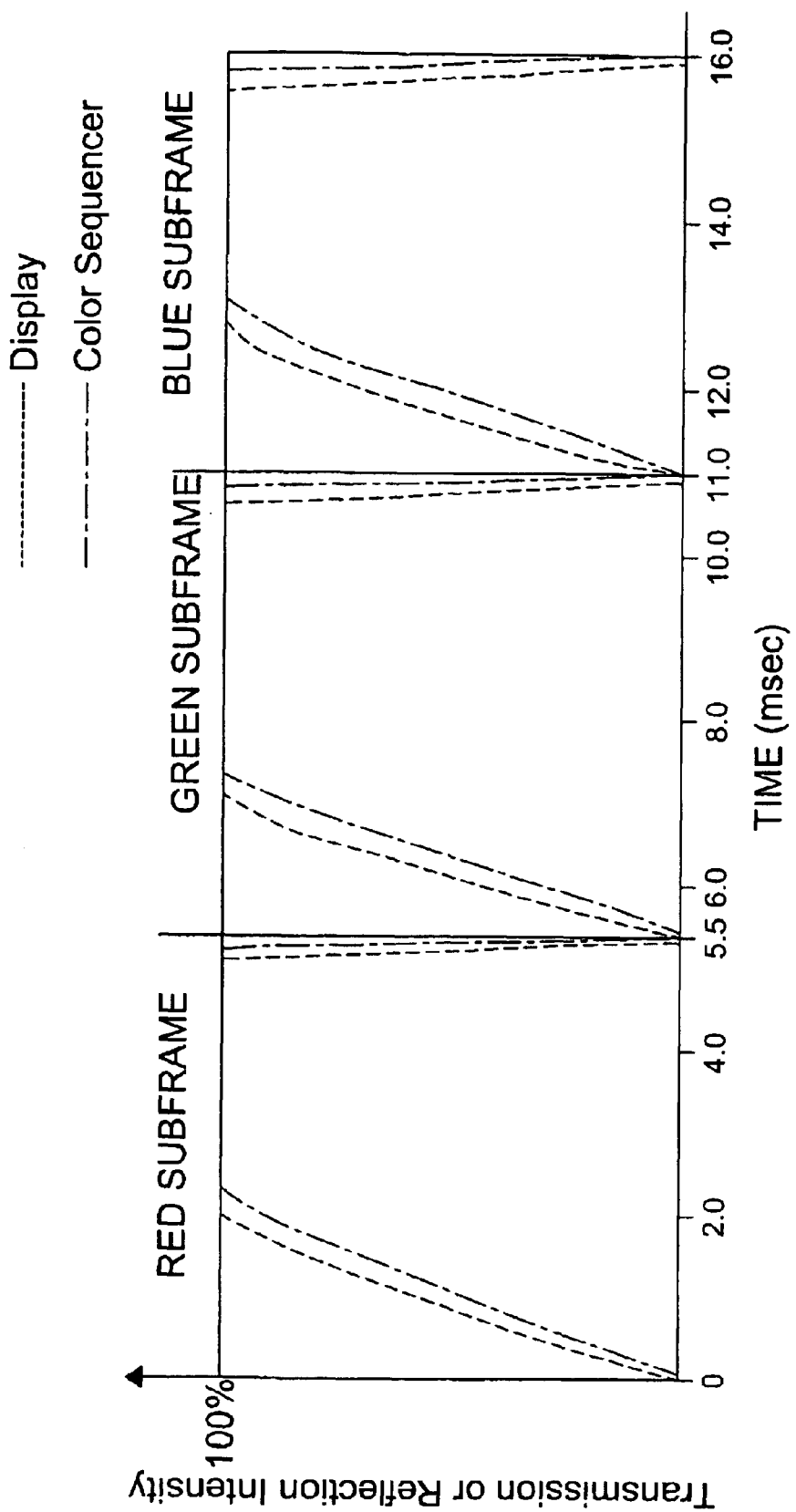
FIG. 13 is a plot showing the transmission or reflection of an SLM display and the transmission of a color sequencer, as a function of time, in accordance with the present invention.
Figure 14:
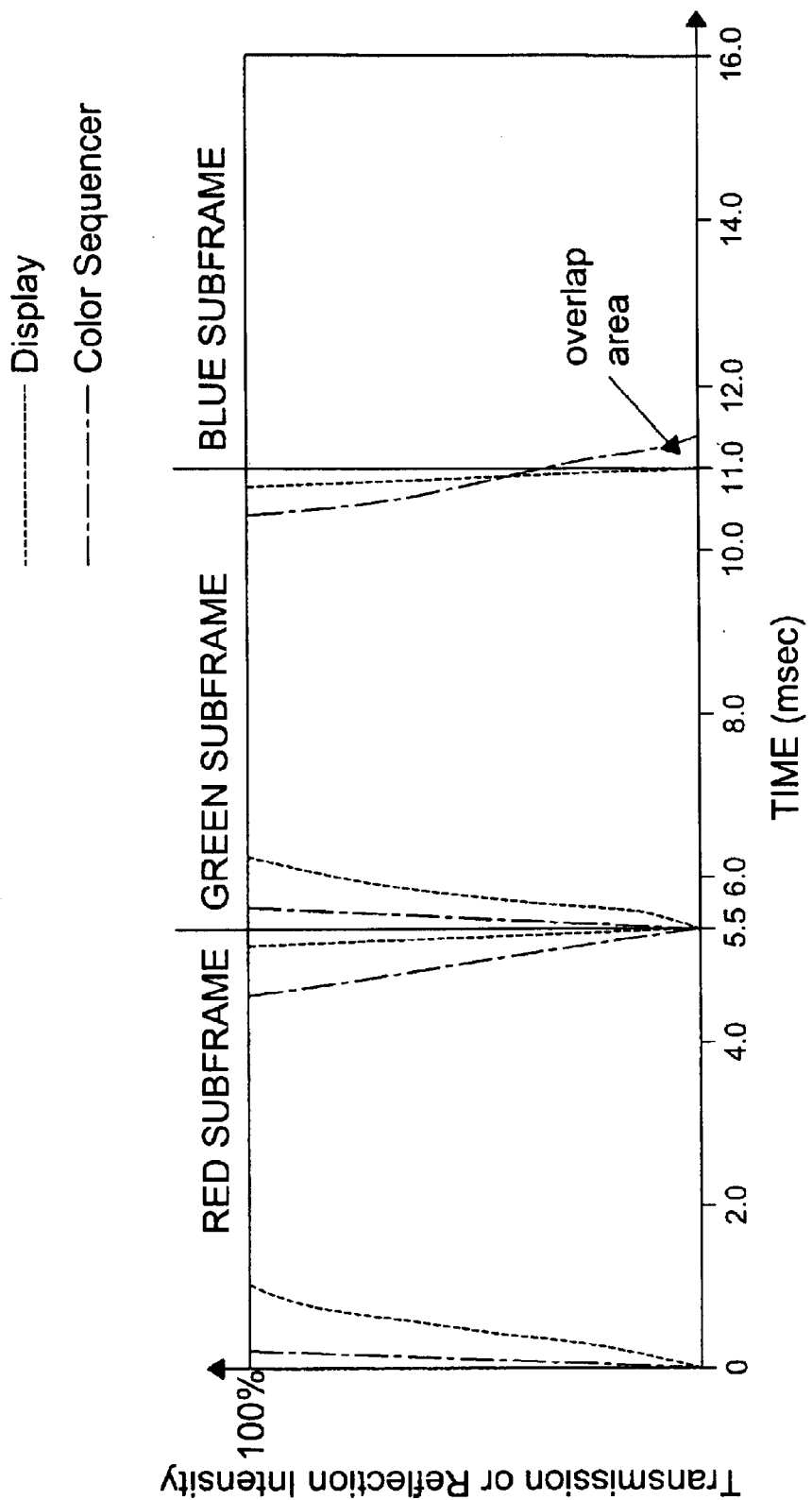
FIG. 14 is a plot showing the transmission or reflection of an SLM display and the transmission of a color sequencer, as a function of time, in accordance with the present invention.

FIGS. 13 and 14 illustrate the trade off between color saturation and brightness in a field-sequential display using liquid crystal SLMs with asymmetric drive schemes. FIG. 13 shows the transmission or reflection of the SLM display, and the transmission of the color sequencer as a function of time for a field-sequential display system. The plot is divided into 5.5 msec time intervals, which represent the red, green and blue subframes. The plot of FIG. 13 is for an SLM display that turns on slow and turns off fast, and a color sequencer that turns on slow and turns off fast. Because the SLM display and the color sequencer only display the correct image data and colors within each color subframe, color saturation is maximized. However, color throughput is not.

The plot of FIG. 14 is for an SLM display that turns on slow and turns off fast, and a color sequencer that turns on fast and turns off slow. If the color sequencer is turned off approximately 1 msec before the end of the color frame, as illustrated in the red subframe, then color saturation is maximized and color throughput is approximately the same as the example shown in FIG. 13. However, if the color sequencer is turned off less than approximately 1 msec before the end of the color frame, as is shown in the green subframe, then color throughput is increased at the expense of color saturation. This is because the color sequencer transmits the color for the previous color subframe after the next color subframe has started. The resulting overlap area, shown in FIG. 14, causes color desaturation. High throughput front projection displays may wish to employ the color sequencer and SLM working in the slow-fast or fast-slow mode to maximize image brightness, whereas rear-projection displays for television and computer monitor applications may be more sensitive to color saturation and may be able to sacrifice some image throughput. The specific display application will dictate which mode operates to give the best performance.

The viewing time is a factor that influences a display's brightness, contrast, color uniformity and color saturation. Consider a field-sequential display system operating a frequency $\geq 180$ Hz. Each color has a maximum "on" time of 5.56 msec. During this time, the image data must be electronically loaded onto the display, the liquid crystal pixels must respond to the applied voltage, and the system must project the color-encoded image data onto the display screen. If this process is repeated for each color within 16.6 msec, the eye integrates the three individual color planes into a single full-color image. The following equation describes the timing of a single field-sequential color plane:

$$\tau_{view} + \tau_{load} + \tau_{LC} = 5.56 \text{ msec}, \quad (1)$$

where $\tau_{view}$ is the viewing time after the image data has been electronically loaded onto the display and the liquid crystal has switched in response to the applied voltage, $\tau_{load}$ is the time needed to electronically load the image data onto the display, and $\tau_{LC}$ is the combined turn-on and turn-off time of the liquid crystal.

1. Nematic Liquid Crystal SLMs $\tau_{LC}$ in nematic liquid crystal SLMs can be less than 2 msec when fabricated as a $\lambda/4$ thick layer on top of a silicon backplane whose integrated circuits are fabricated in a 5 volt, CMOS standard 1.2 $\mu$m process. Furthermore, it is assumed that $\tau_{load}$ is approximately 2 msec, which is a modest amount of time to load a full frame of analog image data onto high resolution production display formats that are currently XGA (1024×769), SXGA (1280×1024) and higher.

Given these assumptions, the view time for each color plane required to exhibit the highest contrast (i.e., pixels that should be on have adequate time to turn fully on, and pixels that should be off have adequate time to turn fully off), and exhibiting the greatest color uniformity (the last image line is written before viewing so that no grey-scale shading occurs across the displayed image) is given by $$\tau_{view} = 5.56 \text{ msec} - \tau_{LC} - \tau_{load}. \quad (2)$$

Figure 15:
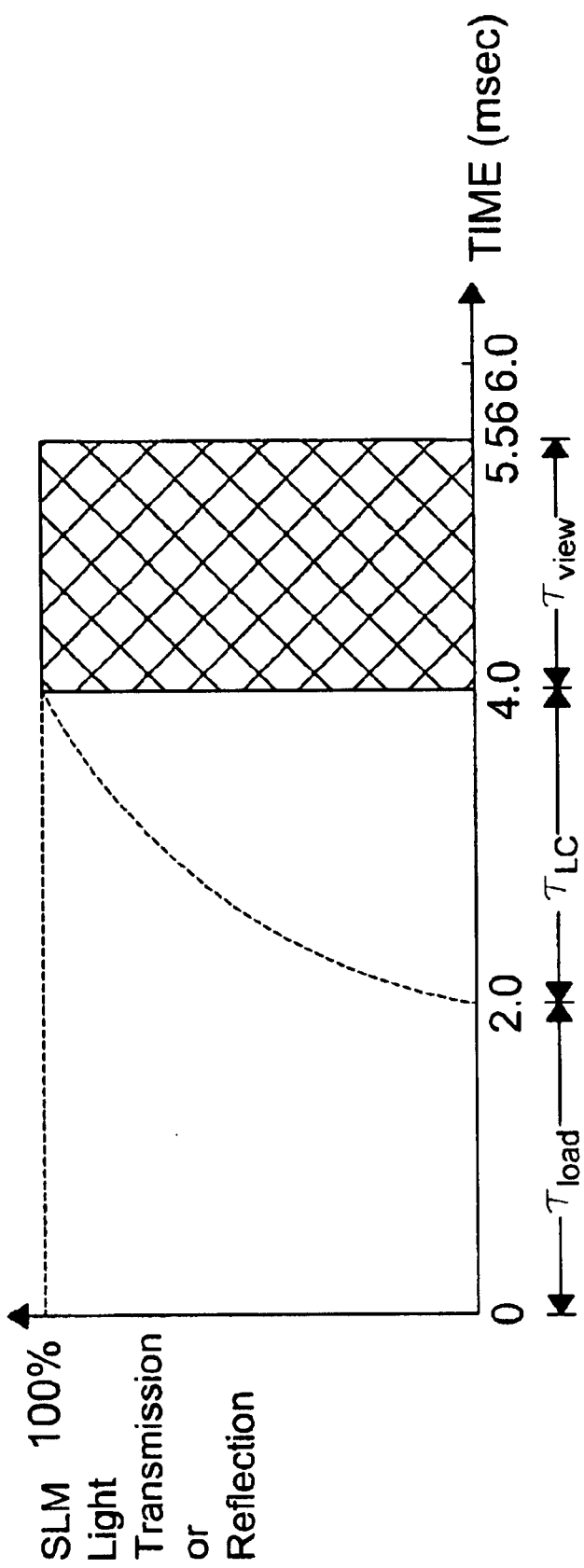
FIG. 15 is a plot of an SLM light transmission or reflection as a function of time, in accordance with the present invention.

Given the above assumptions, $\tau_{view}$ comes out to 1.56 msec. This situation is illustrated in FIG. 15, which is a plot of the SLM light transmission or reflection as a function to time. As can be seen from FIG. 15, the hatched area under the transmission or reflection vs. time curve represents $\tau_{view}$. This hatched area is relatively small when compared to the area ($\tau_{view}$) that is potentially available for displaying any particular color.

Specifically, out of a potential maximum view time of 5.56 msec, only 1.56 msec is actually viewable to achieve maximum display quality when the pixel architecture of the display is a dynamic random access memory utilizing one or more transistors. This corresponds to less than 30% display throughput.

If a frame buffer pixel circuit is used that is capable of storing a data value on the liquid crystal while a new data value is being loaded onto the display, then the image frame can be viewed while the next frame of image data is loaded onto the display. This increases the view time in the above example from 1.56 msec to a minimum of 3.56 msec, which more than doubles the display brightness.

Furthermore, a frame buffer pixel circuit also mediates the color shading or non-uniformity problem that occurs in line-at-a-time addressing schemes, without having to incorporate additional storage. This is because a frame buffer pixel circuit allows the liquid crystal to be addressed a frame-at-a-time, even though the image data is electrically loaded onto the display a line-at-a-time. Thus, utilizing a frame buffer pixel circuit also results in a display that can be viewed not only during the time over which the image data is electronically loaded onto the display, but also during the liquid crystal switching time since all pixels switch at the same time. Accordingly, the display can be viewed during the full 5.56 msec to achieve maximum brightness, contrast and color saturation by taking into account the rise and fall characteristics of the liquid crystal when calculating the voltages to be loaded onto the display. Depending on the liquid crystal response times, the percentage view times can approach 80%–90% of the total time available in a particular color frame. This triples the amount of light projected by the combined field-sequential/SLM projection engine. The faster the liquid crystal switch turns on and off, the brighter the display.

2. Ferroelectric Liquid Crystal SLMs and Other Fast Switching Displays

Ferroelectric liquid crystals (FLCs) are generally binary electro-optic devices. Grey-scale is achieved by either spatial or temporal multiplexing. Spatial 114 multiplexing 8 bits is area intensive and costly for silicon-based spatial light modulators. Temporal multiplexing requires at least 8 electronic frame load times and 8 liquid crystal transition times.

Figure 16:
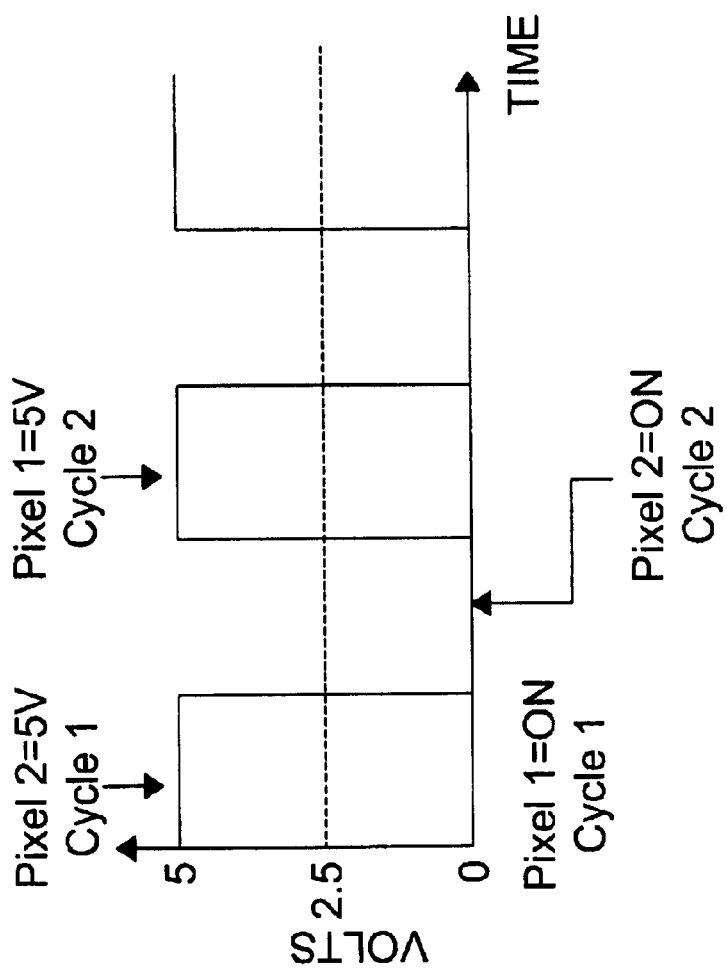
FIG. 16 is the voltage on a cover glass electrode of an FLC spatial light modulator as a function of time, in accordance with the present invention.

Because FLC materials are less pure than active-matrix nematic liquid crystals, it is particularly important to DC balance these spatial light modulators. The DC balancing requires loading an inverse data frame for each valid data frame, thus doubling the electric load frame time and the liquid crystal transition times. This applies unless a more complicated pixel architecture is employed, where the voltages at each pixel are inverted in synchronism with the voltages being inverted on the indium tin oxide cover glass electrode. This can be accomplished with a frame buffer pixel architecture, or a simple flip-flop or inverter at each pixel, such that whatever the voltage was at the pixel (either 5 or 0 volts), the opposite voltage is applied during the inverse frame (0 or 5 volts). This accomplishes DC balancing when the cover electrode is toggled between 5 volts and 0 volts on alternative frames, as illustrated in the plot of FIG. 16. This also maximizes the voltage across the liquid crystal layer, i.e., all 5 volts are available to switch the liquid crystal. In contrast, prior display systems drive the cover glass electrode halfway between 0 and 5 volts (i.e., approximately 2.5 volts), thus halving the voltage across the liquid crystal.

In FLC spatial light modulators as described above, the inverse frame appears optically inverted, because the molecular torque is a first-order function of the applied electric field. Hence, the image frame and the inverse frame are not valid data frames. This effect is mitigated by either adding a single cell shutter to invert the optical polarity of the entire image, or simply not viewing the display during the inverse frame. The former is preferred for maximizing system throughput while the latter allows for a less expensive, less complicated display system.

The minimum view time of a subframe consisting of 1 bit binary data in an FLC LCOS display is limited by the longer of the time it takes to load a frame of data, and the time it takes the FLC modulator to switch. With 1.2 $\mu$m CMOS processes providing 5 volts across the liquid crystal layer, the liquid crystal response time can be as fast as 100 $\mu$sec at room temperature. As discussed above, loading a frame of 1280×1024 binary image data with 32 parallel lines operating at 50 Mbits/sec requires 800 $\mu$sec. Even if 64 parallel lines are used and the data clock rate is doubled, it will still take 200 $\mu$sec [(1 sec/100 Mbits)×20 shifts×1024 lines] to load a frame of data. Hence, the minimum view time without a frame buffer pixel circuit is 200 $\mu$sec. Therefore, the number of bits that can be displayed using temporal multiplexing only, in a field-sequential display system operating at 180 Hz is 4 bits/color. This assumes that the inverse frame is locally stored.

One method for achieving the proper multiplexed grey-scale level, in spite of the increased minimum view time, is to use temporal/intensity modulation, which is described in detail in U.S. Pat. No. 5,767,828, issued on Jun. 16, 1998, and which is herein incorporated by reference in its entirety. Spatial modulation may also be employed in conjunction with temporal/intensity modulation, but it is area intensive such that more than 2 bits of spatial modulation may not be practical in a high resolution display. With temporal/intensity modulation, the illumination intensity incident upon the spatial light modulator is decreased to compensate for the longer view time. Using temporal/intensity modulation, the optical intensity of the four least significant bits is decreased by ½, ¼, ⅛ and ¹⁄₁₆, respectively, as compared to the intensity of the four most significant bits. Temporal/intensity modulation provides 8 bits/color but reduces the system optical throughput to approximately 88% of its maximum value when encoding the four least significant bits in the manner discussed above.

If the backplane SLM data values at the pixel can be inverted without paying the time penalty of loading another frame of data, then the view time for an FLC SLM, equation (1), becomes $$\tau_{view}+N\tau_{load}+N\tau_{LC}=5.56 \text{ msec}, \qquad (3)$$

where N is the number of bit planes written to the SLM to achieve an Nbit-per-color image.

Without temporal/intensity modulation, only 4 bits (N=4) can be achieved with the highest display contrast and color saturation. The available view time can be calculated with equation (3) above, using N=4, $\tau_{load}$=200 $\mu$sec, and $\tau_{LC}$=100 $\mu$sec. Using these parameters, the available view time is only 4.2 msec. This is equivalent to approximately 76% optical throughput, but only achieves 4 bits/color.

To increase the color depth, view time and enhance the projection brightness of the FLC SLM display, the display must be viewable during the time that image data is loaded onto the SLM. Using a frame buffer pixel circuit, the view time is limited by the difference between the load time and the liquid crystal switching time. If $\tau_{load}$=800 $\mu$sec, this time is 700 $\mu$sec. If $\tau_{load}$=200 $\mu$sec, this time is only 100 $\mu$sec.

With FLC SLM displays, grey-scale is achieved by temporal multiplexing. 8 bit-per-color requires that each color frame time be broken up into 256 levels. Thus, the view time of the least significant bit ($\tau_{LSB}$) is $$\tau_{LSB} = \frac{5.56 \text{ msec}}{256} = 22 \text{ }\mu\text{sec}. \qquad (4)$$

The situation is the same for binary switched DMDs and the diffraction grating devices. This problem becomes worse when the color frame time goes down as the need a to operate the display at higher frequencies arises (e.g., in order to mediate color artifacts). The problem with a 22 μsec least significant bit view time is that neither an FLC SLM nor a DMD SLM can switch that fast. Accordingly, the individual color planes must be both temporally and intensity modulated.

U.S. Pat. No. 5,767,828 describes how the illumination intensity incident on the SLM can be decreased to compensate for the larger view times that are more commensurate with the switching times of the FLC or DMD SLM devices. If the three least significant bits are illumination and intensity modulated, the viewing time is increased to approximately 100 μsec, and the overall system display brightness is only reduced to 96% of its maximum brightness. This is an acceptable compromise for increasing the color depth from 4–5 bits to 8 bits, and only possible with a frame buffer pixel architecture. In summary, without a frame buffer pixel circuit or temporal/intensity modulation, the maximum color bit depth is 4 bits. With a frame buffer circuit pixel, but without temporal/intensity modulation, you increase the color bit depth to 5 bits/color. Using a frame buffer circuit pixel and temporal/intensity modulation allows you to achieve 8 bits/color with only a 4% loss in optical throughput.

A feature of the present invention is the use of an opto-electronic color sequencer to intensity modulate the lamp source in order to obtain an increase in color depth. The color depth can be increased by either modulating the overall intensity of the color (illumination modulation) or by modulating the amount of time the opto-electronic color sequencer transmits the color (temporal modulation).

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. For example, although the above-described embodiments of the present invention were described in the context of red, green and blue sequential displays, it should be understood that the present invention can also be used with display systems that display other colors sequentially, e.g., cyan, magenta and yellow. In general any display system that sequentially displays any combination of spectrums falls within the scope of the present invention.

In the claims, means-plus-function clauses are intended to cover the structures described herein as performing the recited function and not only structural equivalents but also equivalent structures. For example, although a focusing mirror and a lens may not be structural equivalents in that a focusing mirror employs a curved reflective surface to focus light, whereas a lens employs a curved transmissive surface to focus light via refraction, in the environment of focusing light, a focusing mirror and a lens may be equivalent structures.

What is claimed is:

1. A display system, comprising:
   an opto-electronic color sequencer that receives input light and that selectively outputs color spectra of the input light, wherein the opto-electronic color sequencer comprises at least one modulator stage, the at least one modulator stage comprising a first retarder stack, a second retarder stack, and a modulator positioned between the first and second retarder stacks: and
   a spatial light modulator optically coupled to the opto-electronic color sequencer that selectively and spatially alters light in accordance with image information;
   wherein the spatial light modulator is selectively driven with color image information in accordance with color spectra selectively output by the opto-electronic color sequencer.

2. The display system of claim 1, wherein the opto-electronic color sequencer comprises:
   a first stage that modulates a first color spectrum in accordance with a first signal;
   a second stage that modulates a second color spectrum in accordance with a second signal; and
   a third stage that modulates a third color spectrum in accordance with a third signal;
   wherein the first, second and third stages arc optically coupled.

3. The display system of claim 2, wherein the first, second and third stages do not include a polarizer.

4. The display system of claim 2, wherein the first and third stages modulate the polarization of the first, second and third color spectra, respectively, in accordance with the first, second and third signals, respectively.

5. The display system of claim 2, wherein the first, second and third stages modulate the transmittance of the first, second and third color spectra, respectively.

6. The display system of claim 2, wherein the transmittance of each of the first, second and third spectra is continuously variable in accordance with the first, second and third signals, respectively.

7. The display system of claim 2, wherein the first, second and third stages each comprise a variable saturation filter adapted to provide more than one color saturation state.

8. The display system of claim 2, wherein the first, second and third stages each comprises a variable luminance filter.

9. The display system of claim 2, wherein each of the first, second and third color spectra comprises one of a red, green and blue spectrum.

10. The display system of claim 2, wherein each of the first, second and third color spectra comprises one of a cyan, magenta and yellow spectrum.

11. The display system of claim 2, wherein each of the first, second and third stages is adapted to modulate its respective color spectrum substantially independently of the other stages.

12. The display system of claim 2, wherein each of the first, second and third stages comprise:
   a first retarder stack;
   a second retarder stack; and
   a modulator between the first and second retarder stacks.

13. The display system of claim 12, wherein the second retarder stack in the first stage and the first retarder stack in the second stage comprise a single retarder stack.

14. The display system of claim 12, wherein the modulator in each stage comprises a liquid crystal modulator.

15. The display system of claim 1, wherein the opto-electronic color sequencer comprises;
   a first modulator stage that exhibits at least a first color state in a first modulator mode and a black state in a second modulator mode;
   a second modulator stage that exhibits a second color state in the first modulator mode and a black state in the second modulator mode; and
   a third modulator stage that exhibits a third color state in the first modulator mode and a black state in the second modulator mode;
   wherein the first, second and third modulator stages are optically coupled.

16. The display system of claim 15, wherein the first modulator mode is a stack-altered mode and the second modulator mode is a stack-only mode.

17. The display system of claim 15, wherein the first modulator mode is a stack-only mode and the second modulator mode is a stack-altered mode.

18. The display device of claim 15, wherein each of the first, second and third modulator stages is adapted to exhibit its respective color and black states substantially independently of the other modulator stages.

19. The display device of claim 1, further comprising illumination optics that receive source light and output the input light to the opto-electronic color sequencer.

20. The display de,ice of claim 19, wherein the illumination optics comprise a polarizer.

21. The display device of claim 19, wherein the illumination optics comprise a polarization conversion system.

22. The display device of claim 19, wherein the polarization conversion system comprises:
 a polarizing beamsplitter that transmits a first portion of the source light having a first polarization state as a first source light portion and reflects a second portion of the source light having a second polarization state that is orthogonal to the first polarization state as a second source light portion;
 a reflector that reflects the second source light portion in a direction that is substantially parallel to a propagation direction of the first source light portion;
 a polarization rotator that is positioned to receive the second source light 10 portion before or after the second source light portion is reflected by the reflector, and that rotates the polarization of the second source light portion to the first polarization state; and
 a lens that receives and substantially collimates the first and second source light portions that arc polarized in the first polarization state.

23. The display system of claim 22, wherein the reflector comprises a right angle prism.

24. The display system of claim 23, wherein the polarization rotator comprises a retarder attached to one of an input face of the right angle prism, an output face of the right angle prism and an output face of the polarizing beamsplitter.

25. The display system of claim 24, wherein the retarder comprises a half-wave retarder that is substantially achromatic.

26. The display system of claim 22, wherein the tens comprises a condenser lens.

27. The display system of claim 22, further comprising at least one filter that receives the source light and that outputs filtered source light to the polarizing beamsplitter.

28. The display system of claim 27, wherein the at least one filter substantially alters out ultraviolet and/or infrared light from the source light.

29. The display system of claim 22, further comprising an aperture configured and positioned such that substantially all of the source light that passes through the aperture is coupled into the polarizing beamsplitter.

30. The display system of claim 22, further comprising a polarizer that is positioned to receive the first and second source light portions that are polarized in the first polarization state, and that blocks residual light that is not polarized in the fist polarization state.

31. The display device of claim 21, wherein the polarization conversion system comprises:
 a first lens array;
 a second lens array; and
 an array of polarizing beamsplitter units positioned between the first and second lens arrays, wherein each polarizing beamsplitter unit comprises:
  a polarizing beamsplitter that transmits a first portion of the source having a first polarization state and reflects a second portion of the source light having a second polarization state that is orthogonal to the first polarization state,
  a reflector that reflects the second source light portion in a direction that is substantially parallel to a propagation direction of the first source light portion, and
  a polarization rotator that is positioned to receive the second source light portion before or after the second source light portion is reflected by the reflector, and that rotates the polarization of the second source light portion to the first polarization state;
 wherein the first lens array focuses the source light into the polarizing beamsplitters, and wherein each lens of the second lens array receives first and second portions of the source light from respective a polarizing beamsplitter unit.

32. The display system of claim 31, wherein the reflector in each polarizing beamsplitter unit comprises a beamsplitter cube.

33. The display device of claim 32, wherein the beamsplitter cube is attached to an output face of the polarizing beamsplitter.

34. The display system of claim 32, wherein the polarization rotator in each polarizing beamsplitter unit comprises a retarder attached to one of an input face of the beamsplitter cube, an output face of the beamsplitter cube and an output face of the polarizing beamsplitter.

35. The display system of claim 36, wherein the retarder comprises a half-wave retarder that is substantially achromatic.

36. The display system of claim 31, further comprising a polarizer that is positioned to receive the first and second source light portions that are polarized in the first polarization state, and that blocks residual light that is not polarized in the first polarization state.

37. The display system of claim 31, further comprising a lens that is positioned to receive the first and second source light portions from the second lens array, wherein the second lens array and the lens together substantially collimate the first and second source light portions.

38. The display system of claim 1, wherein the spatial light modulator comprises a reflective spatial light modulator.

39. The display system of claim 1, wherein the spatial light modulator comprises a transmissive spatial light modulator.

40. The display system of claim 1, wherein the spatial light modulator comprises an analog spatial light modulator.

41. The display system of claim 40, wherein the analog spatial light modulator comprises a nematic liquid crystal spatial light modulator.

42. The display system of claim 1, wherein the spatial light modulator comprises a binary spatial light modulator.

43. The display system of claim 42, wherein the binary spatial light modulator comprises a digital mirror device.

44. The display system of claim 42, wherein the binary spatial light modulator comprises a chiral smectic spatial liquid crystal spatial light modulator.

45. The display system of claim 1, wherein the spatial light modulator comprises an optically addressed spatial light modulator.

46. The display system of claim 1, wherein the opto-electronic color sequencer is adapted to selectively output red green, blue and white spectrum.

47. The display system of claim 1, wherein the opto-electronic color sequencer is adapted to selectively output red, green, blue, yellow, and white spectra.

48. The display system of claim 1, wherein the opto-electronic color sequencer is adapted to selectively output red, green, blue, cyan, magenta and yellow spectra.

49. A display system, comprising:
- an opto-electronic color sequencer that receives input light and that selectively outputs color spectra of the input light, wherein the opto-electronic color sequencer comprises at least one modulator stage, the at least one modulator stage comprising a first retarder stack, a second retarder stack, and a modulator positioned between the first and second retarder stacks; and
- a frame buffer spatial light modulator optically coupled to the opto-electronic color sequencer that selectively and spatially alters light in accordance with image information;
- wherein the frame buffer imager spatial light modulator is selectively driven with color image information in accordance with color spectra selectively output by the opto-electronic color sequencer.

50. The display system of claim 49, wherein the frame buffer spatial light modulator comprises a plurality of pixels, each pixel comprising:
- a pixel electrode;
- a driving circuit coupled to the pixel electrode to drive the pixel electrode to a present pixel value; and
- a holding unit coupled to the driving circuit, and adapted to hold a future pixel value while the hiving circuit drives the pixel electrode with the present pixel value.

51. The display system of claim 49, wherein the frame buffer spatial light modulator comprises a reflective frame buffer spatial light modulator.

52. The display system of claim 49, wherein the frame buffer spatial light modulator comprises a transmissive frame buffer spatial light modulator.

53. The display system of claim 52, further comprising a lens array that focuses light output by the opto-electronic color sequencer through pixels in the transmissive frame buffer spatial light modulator.

54. The display system of claim 49, wherein the frame buffer spatial light modulator comprises an analog frame buffer spatial light modulator.

55. The display system of claim 54, wherein the analog frame buffer spatial light modulator comprises a nematic liquid crystal spatial light modulator.

56. The display system of claim 54, wherein the frame buffer spatial light modulator comprises a binary frame buffer spatial light modulator.

57. The display system of claim 56, wherein the binary frame buffer spatial light modulator comprises a digital mirror device.

58. The display system of claim 56, wherein the binary, frame buffer spatial light modulator comprises a chiral smectic spatial liquid crystal spatial light modulator.

59. The display system of claim 54, wherein the frame buffer spatial light modulator comprises an optically addressed spatial light modulator.

60. The display system of claim 54, wherein the opto-electronic color sequencer comprises;
- a first stage that modulates a first color spectrum in accordance with a first signal;
- a second stage that modulates a second color spectrum in accordance with a second signal; and
- a third stage that modulates a third color spectrum in accordance with a third signal;
- wherein the first, second and third stages are optically coupled.

61. The display system of claim 60, wherein each of the first, second and third stages is adapted to modulate its respective color spectrum substantially independently of the other stages.

62. The display system of claim 60, wherein each of the first, second and third stages comprise;
- a first retarder stack;
- a second retarder stack; and
- a modulator between the first and second retarder stacks.

63. The display system of claim 62, wherein the second retarder stack in the first stage and the first retarder stack in the second stage comprise a single retarder stack.

64. The display system of claim 54, wherein the opto-electronic color sequencer comprises:
- a first modulator stage that exhibits a first color state in a first modulator mode and a black state in a second modulator mode;
- a second modulator stage that exhibits a second color state in the first modulator mode and a black state in the second modulator mode; and
- a third modulator stage that exhibits a third color state in the first modulator mode and a black state in the second modulator mode;
- wherein the first, second and third modulator stages are optically coupled.

65. The display device of claim 64, wherein each of the first, second and third modulator stages is adapted to exhibit its respective color and black states substantially independently of the other modulator stages.

66. The display system of claim 64, wherein each of the first, second and third modulator stages comprise:
- a first retarder stack;
- a second retarder stack; and
- a modulator between the first and second retarder stacks.

67. The display system of claim 66, wherein the second retarder stack in the first stage and the first retarder stack in the second stage comprise a single retarder stack.

68. A display system comprising:
- an opto-electronic color sequencer that receives input light and that selectively outputs color spectra of the input light, wherein the opto-electronic color sequencer comprises at least two stages, without any interposing polarizers, that each modulate a polarization state of a respective color spectrum; and
- a spatial light modulator optically coupled to the opto-electronic color sequencer that selectively and spatially alters light in accordance with image information;
- wherein the spatial light modulator is selectively driven with color image information in accordance with color spectra selectively Output by the opto-electronic color sequencer.

* * * * *